United States Patent
Takeuchi et al.

(10) Patent No.: US 6,647,495 B1
(45) Date of Patent: *Nov. 11, 2003

(54) INFORMATION PROCESSING APPARATUS AND METHOD AND RECORDING MEDIUM

(75) Inventors: Akikazu Takeuchi, Tokyo (JP); Shinji Nanba, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/065,431

(22) Filed: Apr. 24, 1998

(30) Foreign Application Priority Data

Apr. 30, 1997 (JP) ............................ P9-112182

(51) Int. Cl.[7] ............................ G06F 9/06; G06F 11/30
(52) U.S. Cl. .................. 713/189; 713/190; 705/57; 705/59
(58) Field of Search ................ 713/176, 174, 713/187, 188, 162, 167, 178, 179, 189, 190; 705/59, 57, 58

(56) References Cited

U.S. PATENT DOCUMENTS

| | | | | |
|---|---|---|---|---|
| 4,924,378 A | * | 5/1990 | Hershey et al. | 705/59 |
| 5,050,212 A | * | 9/1991 | Dyson | 713/187 |
| 5,343,527 A | * | 8/1994 | Moore | 713/179 |
| 5,724,425 A | * | 3/1998 | Chang et al. | 713/187 |

FOREIGN PATENT DOCUMENTS

| | | | | |
|---|---|---|---|---|
| EP | 0 706 118 A1 | * | 4/1996 | G06F/9/06 |
| EP | 0 718 756 A1 | * | 6/1996 | G06F/9/06 |

* cited by examiner

*Primary Examiner*—Justin T. Darrow
(74) *Attorney, Agent, or Firm*—Jay H. Maioli

(57) ABSTRACT

In an information processing apparatus and method, an application program that was encrypted using secret key-A is supplied to a decoding section 82, and publicized key-B and an encrypted publicized key-A (corresponding to secret key-A) that was encrypted by using secret key-B corresponding to publicized key-B are supplied to a decoding section 84. The decoding section 84 decodes the encrypted publicized key-A by using publicized key-B and supplies a resulting publicized key-A to the decoding section 82. The decoding section 82 decodes the encrypted application program by using publicized key that is supplied from the decoding section 84 and supplies Java byte codes as a decoding result to a Java virtual machine 83. The Java virtual machine 83 interprets and executes the Java byte codes that are supplied from the decoding section 82. As a result, it becomes possible to allow only programs developed by a legitimate software developer to be executed in certain program execution environments.

4 Claims, 21 Drawing Sheets

EXECUTION RESULT IN ACTUAL COMPUTER

EXECUTION RESULT AS VIEWED FROM JAVA VIRTUAL MACHINE

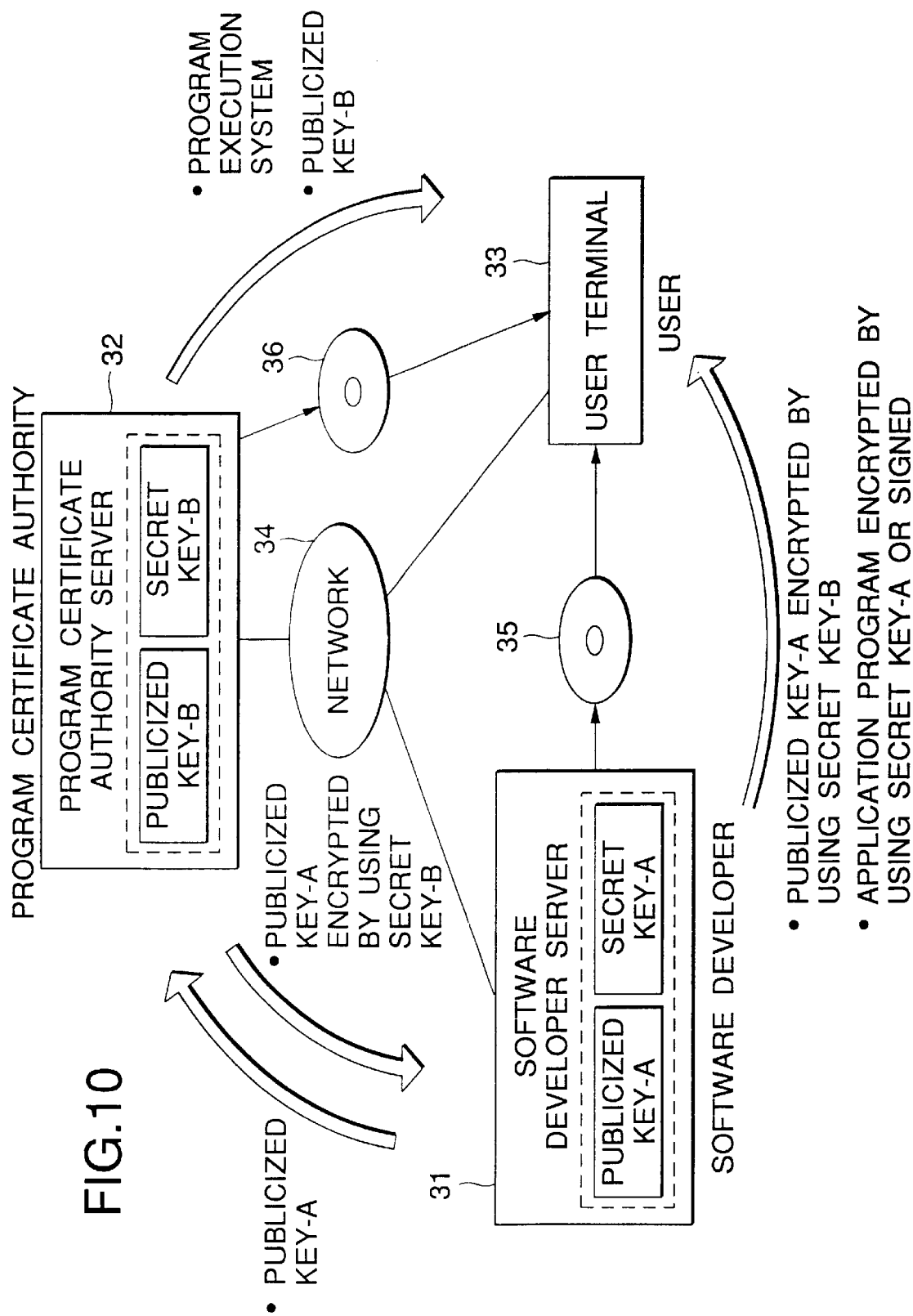

INFORMATION PROCESSING APPARATUS AND METHOD AND RECORDING MEDIUM

BACKGROUND OF THE INVENTION

1. Field of the Invention

The present invention relates to an information processing apparatus and method and a recording medium. In particular, the invention relates to an information processing apparatus and method and a recording medium which allow only programs that were developed by a legitimate program developer to be executed in a certain program execution environment.

2. Description of the Related Art

Java (trademark of Sun Microsystems, Inc. of the U.S.A.) now attracts much attention because it is suitable for the Internet, which has spread rapidly in recent years. The term "Java" is used to refer to each of the Java language which is an object-oriented language, a virtual machine (hereinafter referred to as "Java virtual machine" where appropriate) that defines a processor architecture suitable for execution of a program (hereinafter referred to as "Java program" where appropriate) written in the Java language, and other elements relating to Java, or it is used as a generic term for them.

The term "virtual machine" means a virtual machine that is assumed in implementing a language processing system rather than a virtual machine that is used to cause a single computer to virtually behave to users as if it were a plurality of computers.

A Java virtual machine is implemented on an actual (real) computer so as to operate on an OS (operating system) that is installed in the computer. On the other hand, a Java program is compiled into binary codes that are constituted of instruction sets of the Java virtual machine. The binary codes can be executed by any hardware in which the Java virtual machine can operate. Therefore, a complied Java program can be executed on various platforms as long as the Java virtual machine operates there.

Based on the fact that a Java program can be executed on any machine once a Java virtual machine is implemented, and other grounds, it is expected that the Java virtual machine will spread to many users and many application programs will be developed and distributed (irrespective of whether they have to be paid for or are free) to many such users.

Under the above circumstances, there may occur a case that a party who has developed and distributed a program execution environment such as a Java virtual machine wants to restrict the distribution of an application program that was developed by a third party and is executed in such a program execution environment; for example, the former party may want to permit distribution of application programs to only licensed parties.

On the other hand, in a Java virtual machine, intermediate codes called byte codes (Java codes) that are obtained by compiling a Java program with a Java compiler are interpreted and executed. Java byte codes can be understood relatively easily by decompiling those, which enables reverse engineering to be performed easily. Therefore, it is necessary to prevent copying and falsification by a third party.

SUMMARY OF THE INVENTION

The present invention has been made under the above circumstances, and an object to the invention is therefore to make it possible to restrict the execution of a program in a certain program execution environment as well as to prevent copying and falsification of a program.

The information processing apparatus according to the first aspect of the present invention comprises first key decoding means for decoding, by using a second key, an encrypted version of a first key that is necessary to decode an encrypted version of a program; program decoding means for decoding the encrypted version of the program by using the first key that is obtained through decoding by the first key decoding means; and executing means for executing the program that is output from the program decoding means.

The information processing method according to the second aspect of the present invention comprises the steps of decoding, by using a second key, an encrypted version of a first key that is necessary to decode an encrypted version of a program; decoding the encrypted version of the program by using the first key that is obtained through the decoding; and executing the program that is obtained by the decoding.

The recording medium according to the third aspect of the present invention is a recording medium on which a program is recorded, the program being for causing a computer to decode, by using a second key, an encrypted version of a first key that is necessary to decode an encrypted version of a program; decode the encrypted version of the program by using the first key that is obtained through the decoding; and execute the program that is obtained by the decoding.

The information processing apparatus according to the fourth aspect of the present invention comprises encrypting means for encrypting a program into encrypted sentences to be decoded into codes that can be executed by the information processing apparatus according to the first aspect of the present invention.

The information processing method according to the fifth aspect of the present invention comprises the step of encrypting a program into encrypted sentences to be decoded into codes that can be executed by the information processing apparatus according to the first aspect of the present invention.

The recording medium according to the sixth aspect of the present invention is a recording medium on which a program is recorded, the program being encrypted into encrypted sentences to be decoded into codes that can be executed by the information processing apparatus according to the first aspect of the present invention.

The information processing apparatus according to the seventh aspect of the present invention comprises executing means for executing a program; key decoding means for decoding, by using a second key, an encrypted version of a first key to be used in checking a signature that is added to the program; checking means for checking, by using the first key that is obtained through decoding by the key decoding means, whether the signature that is added to the program is legitimate; and supplying means for supplying the executing means with the program that has been affirmed to be legitimate by the checking means and to which the signature is added.

The information processing method according to the eighth aspect of the present invention comprises the steps of decoding, by using a second key, an encrypted version of a first key to be used in checking a signature that is added to a program; checking, by using the first key that is obtained through the decoding, whether the signature that is added to the program is legitimate; and executing the program only when it is affirmed to be legitimate.

The recording medium according to the ninth aspect of the present invention is a recording medium on which a program is recorded, the program being for causing a computer to decode, by using a second key, an encrypted version of a first key to be used in checking a signature that is added to a program; check, by using the first key that is obtained through the decoding, whether the signature that is added to the program is legitimate; and execute the program only when it is affirmed to be legitimate.

The information processing apparatus according to the tenth aspect of the present invention comprises processing means for processing a program so that a signature will be confirmed to be legitimate in the information processing apparatus according to the seventh aspect of the present invention.

The information processing method according to the eleventh aspect of the present invention comprises the step of processing a program so that a signature will be confirmed to be legitimate in the information processing apparatus according to the seventh aspect of the present invention.

The recording medium according to the twelfth aspect of the present invention is a recording medium on which a program is recorded, the program having been processed so that a signature will be confirmed to be legitimate in the information processing apparatus according to the seventh aspect of the present invention.

In the information processing apparatus according to the first aspect of the present invention, the first key decoding means decodes, by using a second key, an encrypted version of a first key that is necessary to decode an encrypted version of a program, and the program decoding means decodes the encrypted version of the program by using the first key that is obtained through decoding by the first key decoding means. The executing means executes the program that is output from the program decoding means.

In the information processing method according to the second aspect of the present invention, an encrypted version of a first key that is necessary to decode an encrypted version of a program is decoded by using a second key, the encrypted version of the program is decoded by using the first key that is obtained through the decoding, and the program that is obtained by the decoding is executed.

On the recording medium according to the third aspect of the present invention, a program for causing a computer to decode, by using a second key, an encrypted version of a first key that is necessary to decode an encrypted version of a program, decode the encrypted version of the program by using the first key that is obtained through the decoding, and execute the program that is obtained by the decoding is recorded.

In the information processing apparatus according to the fourth aspect of the present invention, the encrypting means encrypts a program into encrypted sentences to be decoded into codes that can be executed by the information processing apparatus according to the first aspect of the present invention.

In the information processing method according to the fifth aspect of the present invention, a program is encrypted into encrypted sentences to be decoded into codes that can be executed by the information processing apparatus according to the first aspect of the present invention.

On the recording medium according to the sixth aspect of the present invention, a program being encrypted into encrypted sentences to be decoded into codes that can be executed by the information processing apparatus according to the first aspect of the present invention is recorded.

In the information processing apparatus according to the seventh aspect of the present invention, the key decoding means decodes, by using a second key, an encrypted version of a first key to be used in checking a signature that is added to a program, and the checking means checks, by using the first key that is obtained through decoding by the key decoding means, whether the signature that is added to the program is legitimate. The supplying means supplies executing means with the program that has been affirmed to be legitimate by the checking means and to which the signature is added. The executing means executes the program.

In the information processing method according to the eighth aspect of the present invention, an encrypted version of a first key to be used in checking a signature that is added to a program is decoded by using a second key, it is checked, by using the first key that is obtained through the decoding, whether the signature that is added to the program is legitimate, and the program is executed only when it is confirmed to be legitimate.

On the recording medium according to the ninth aspect of the present invention, a program for causing a computer to decode, by using a second key, an encrypted version of a first key to be used in checking a signature that is added to a program, check, by using the first key that is obtained through the decoding, whether the signature that is added to the program is legitimate, and execute the program only when it is confirmed to be legitimate is recorded.

In the information processing apparatus according to the tenth aspect of the present invention, the processing means processes a program so that a signature will be confirmed to be legitimate in the information processing apparatus according to the seventh aspect of the present invention.

In the information processing method according to the eleventh aspect of the present invention, a program is processed so that a signature will be confirmed to be legitimate in the information processing apparatus according to the seventh aspect of the present invention.

On the recording medium according to the twelfth aspect of the present invention, a program having been processed so that a signature will be confirmed to be legitimate in the information processing apparatus according to according to the seventh aspect of the present invention is recorded.

BRIEF DESCRIPTION OF THE DRAWINGS

FIG. 10 is a block diagram showing an example of configuration of an embodiment of a program providing system according to the present invention;

DETAILED DESCRIPTION OF THE PREFERRED EMBODIMENTS

Figure 1:
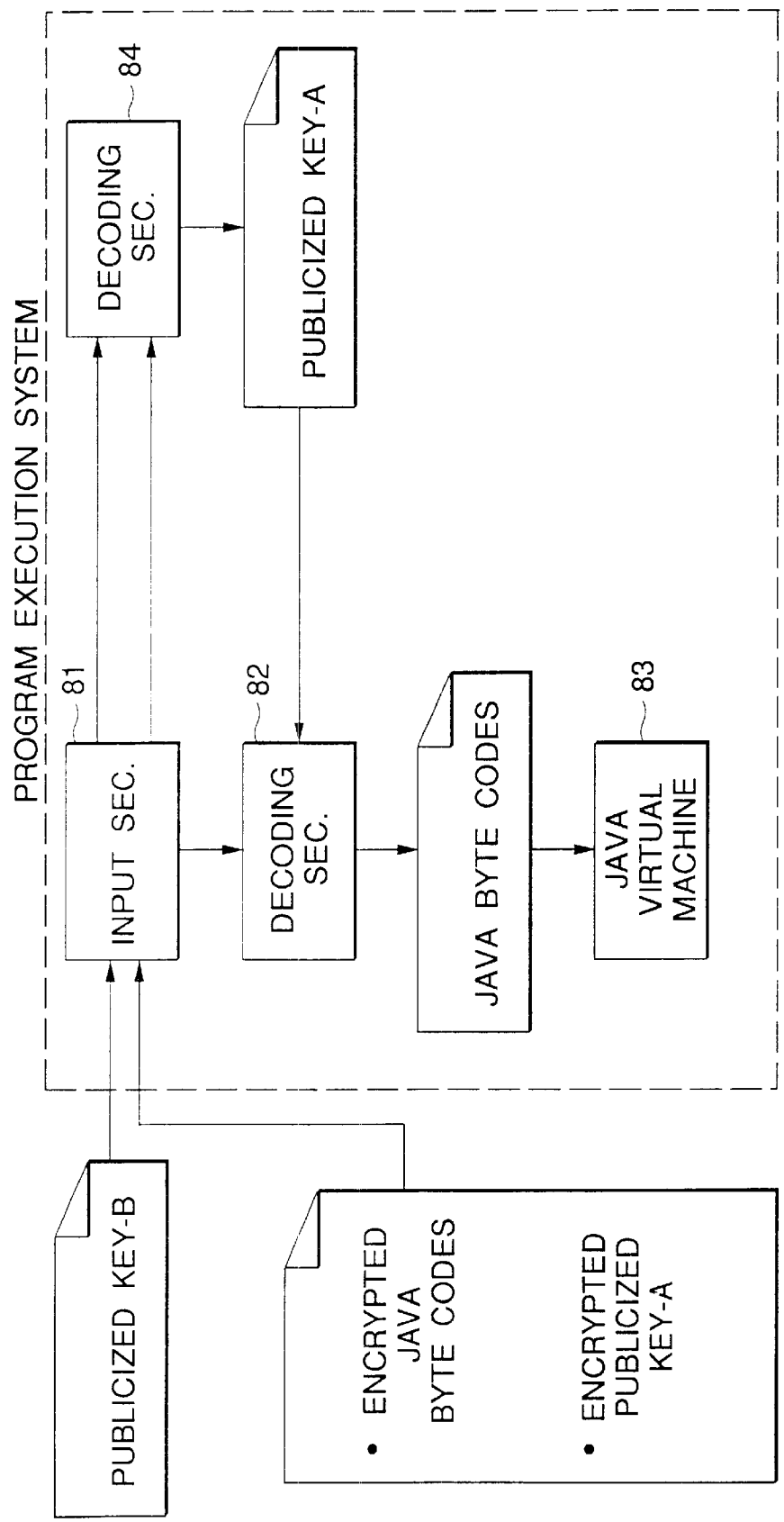
FIG. 1 is a block diagram showing a first example of functional configuration of a program execution system.

The embodiments of the present invention will be described below. Before that, to clarify the correlation between the respective means of the invention that are described in the claims and the components of the following embodiments, the features of the invention will be described below in such a manner that the respective means are followed, in parentheses, by the components (just examples) of the corresponding embodiments.

The information processing apparatus according to the first aspect of the present invention is an information processing apparatus which executes a process for executing a program and which comprises first key decoding means (for example, a decoding section 84 shown in FIG. 1 and a decoding section 131 shown in FIG. 2) for decoding, by using a second key, an encrypted version of a first key that is necessary to decode an encrypted version of the program; program decoding means (for example, a decoding section 82 shown in FIG. 1 and a decoding means 132 shown in FIG. 2) for decoding the encrypted version of the program by using the first key that is obtained through decoding by the first key decoding means; and executing means (for example, a Java virtual machine 83 shown in FIGS. 1 and 2) for executing the program that is output from the program decoding means.

The above information processing apparatus further comprises second key decoding means (for example, a decoding section 84 shown in FIG. 2) for decoding, by using a third key, an encrypted version of the second key in a case where the second key is encrypted.

The information processing apparatus according to the fourth aspect of the present invention is an information processing apparatus which executes a program, and comprises encrypting means (for example, a CPU 41 shown in FIG. 11 that executes a program processing step S7 shown in FIG. 3) for encrypting the program into encrypted sentences to be decoded into codes that can be executed by the information processing apparatus according to the first aspect of the present invention.

Figure 4:
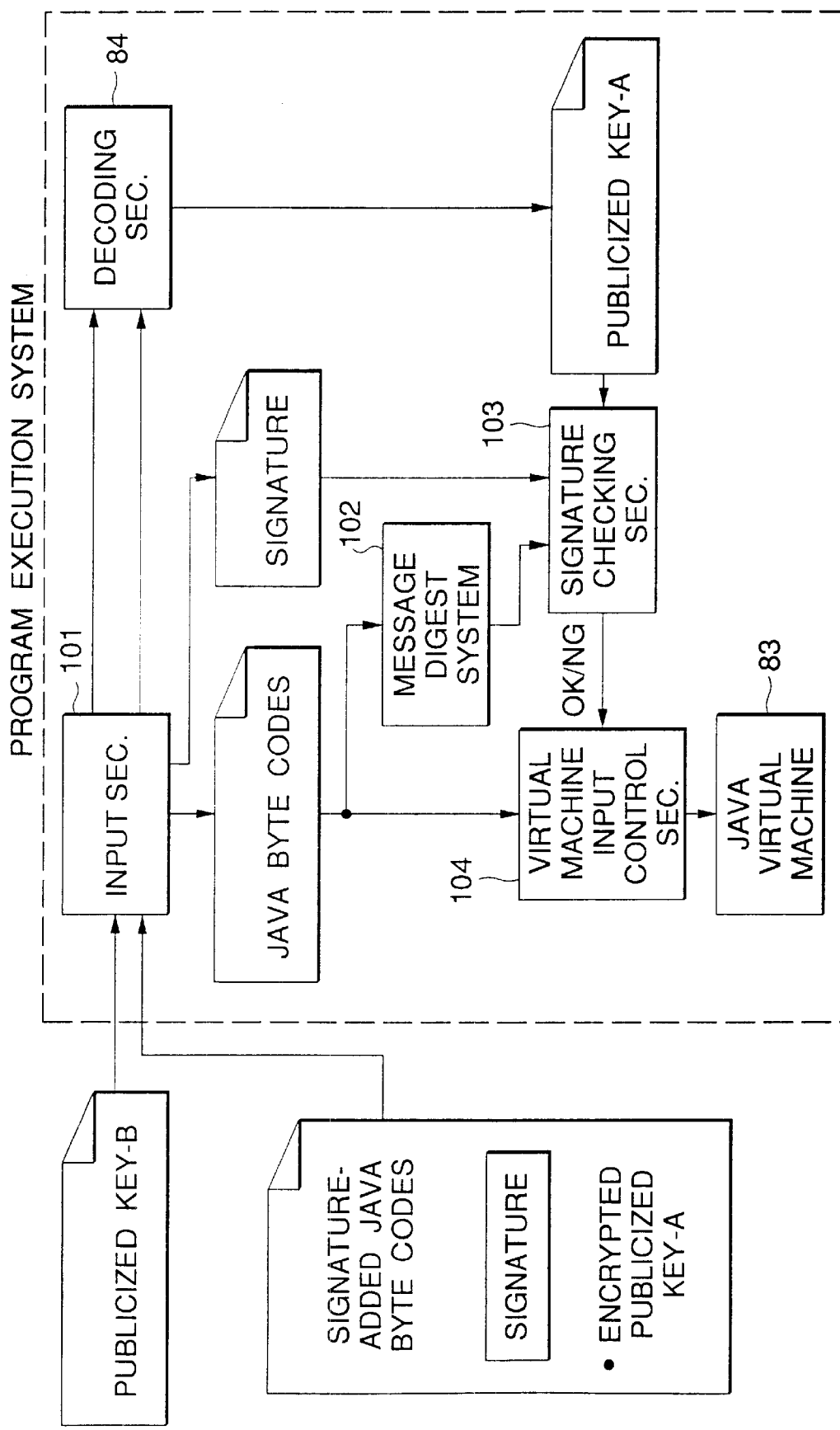
FIG. 4 is a block diagram showing a third example of functional configuration of a program execution system.

The information processing apparatus according to the seventh aspect of the present invention is an information processing apparatus which executes a program, and comprises executing means (for example, a Java virtual machine 83 shown in FIG. 4) for executing the program; key decoding means (for example, a decoding section 84 shown in FIG. 4) for decoding, by using a second key, an encrypted version of a first key to be used in checking a signature that is added to the program; checking means (for example, a signature checking section 103 shown in FIG. 4) for checking, by using the first key that is obtained through decoding by the key decoding means, whether the signature that is added to the program is legitimate; and supplying means (for example, a virtual machine input control section 104 shown in FIG. 4) for supplying the executing means with the program that has been confirmed to be legitimate by the checking means and to which the signature is added.

The information processing apparatus according to the tenth aspect of the present invention is an information processing apparatus which executes a program, and comprises processing means (for instance, a CPU 41 shown in FIG. 11 that executes program processing steps S22 and S23 shown in FIG. 16) for processing the program so that a signature will be confirmed to be legitimate in the information processing apparatus according to the seventh aspect of the present invention.

Naturally, the above statements do not mean that the respective means are limited to the components that follow.

The following embodiments will be directed to a case where the invention is applied to a Java virtual machine, though the invention can be applied to a real machine itself in addition to a virtual machine such as a Java virtual machine.

Since Java is described in detail in, for instance, Nikkei Electronics 1996.3.25 (no. 658) and 1996.6.17 (no. 664) published by Nikkei Business Publications, Inc., it will be described below only briefly.

A Java virtual machine is an abstracted execution machine and is actually a program that is executed by an actual computer. Like an actual computer, a Java virtual machine has a program counter, a stack register, a general-purpose register, a memory as a stack or a heap, and other resources, and those resources are mapped to resources of an actual computer.

Figure 6:
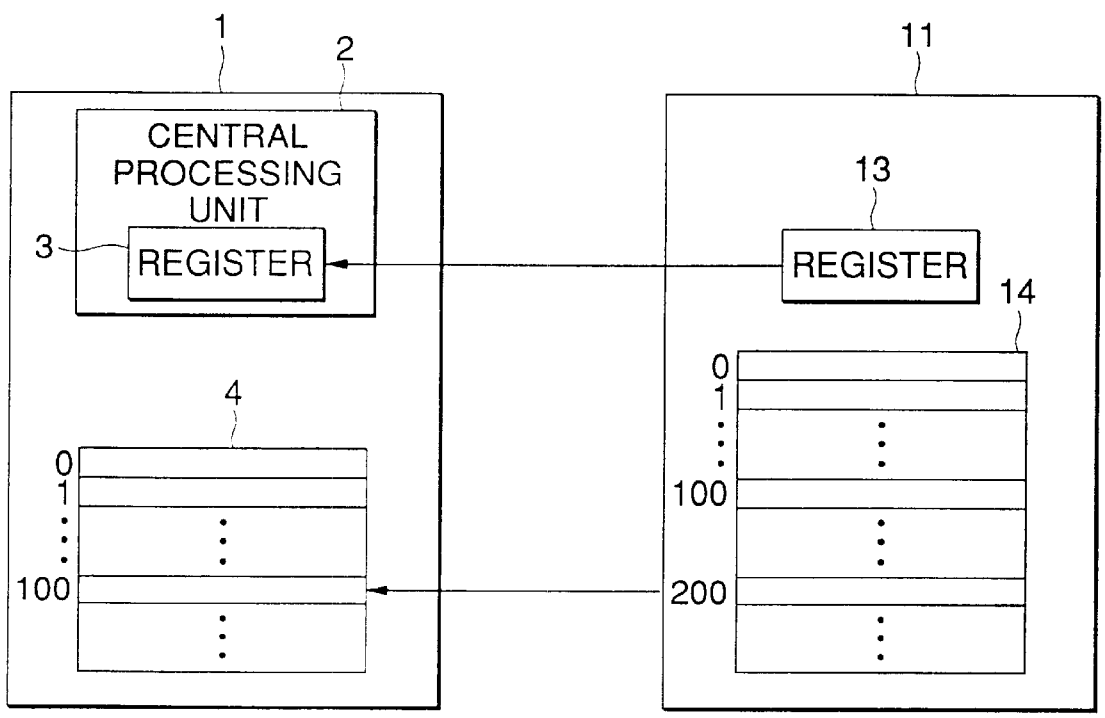
FIG. 6 shows a correlation between resources of a computer 1 and those of a Java virtual machine 11 that is implemented on the computer 1.

Assume that an actual computer 1 has a central processing unit 2, a register 3 that is incorporated in the central processing unit 2, a memory 4, and other resources as shown in FIG. 6. When a Java virtual machine 11 is implemented on the computer 1, the resources of the actual computer 1 are mapped to those of the Java virtual machine 11. In the embodiment of FIG. 6, the Java virtual machine 11 has a register 13, a memory 14, and other resources. The register 13 is mapped to the register 3 and address 200 of the memory 14 is mapped to address 100 of the memory 4.

In the actual computer 1, an instruction to the central processing unit 2 is executed as a manipulation on its resource. Similarly, in the Java virtual machine 11, instructions to be executed as manipulations on its resources are defined. The Java language is a language to describe instructions to the Java virtual machine 11. In the Java virtual machine, Java byte codes that are obtained by compiling a source program described in the Java language with a Java compiler are interpreted and executed.

Figure 7:
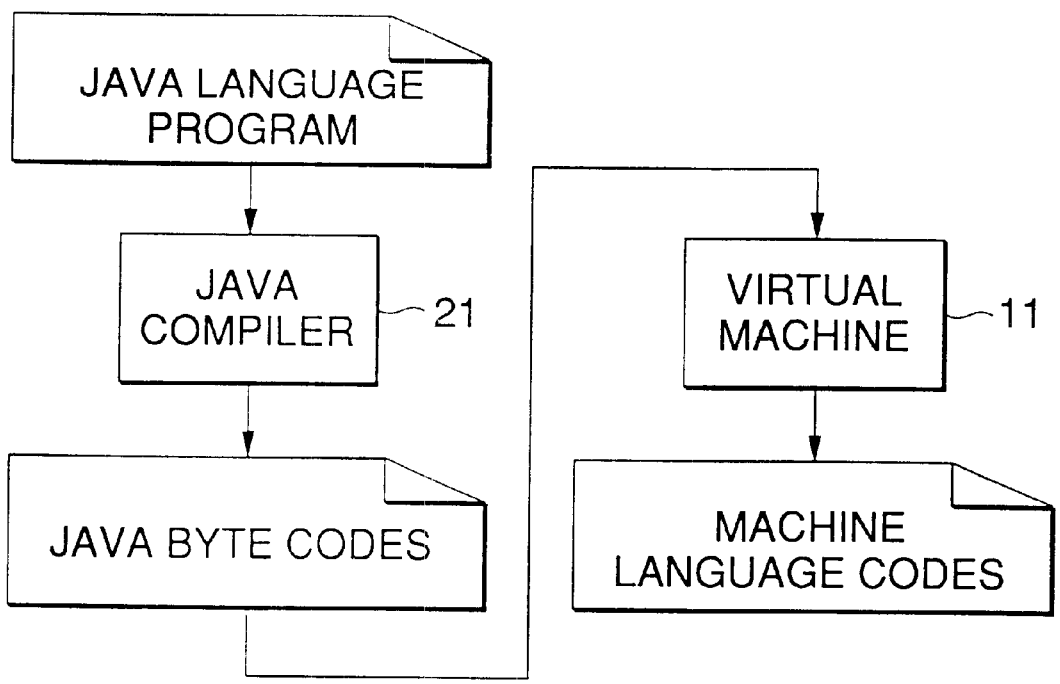
FIG. 7 illustrates a process of the Java virtual machine
Figure 8:
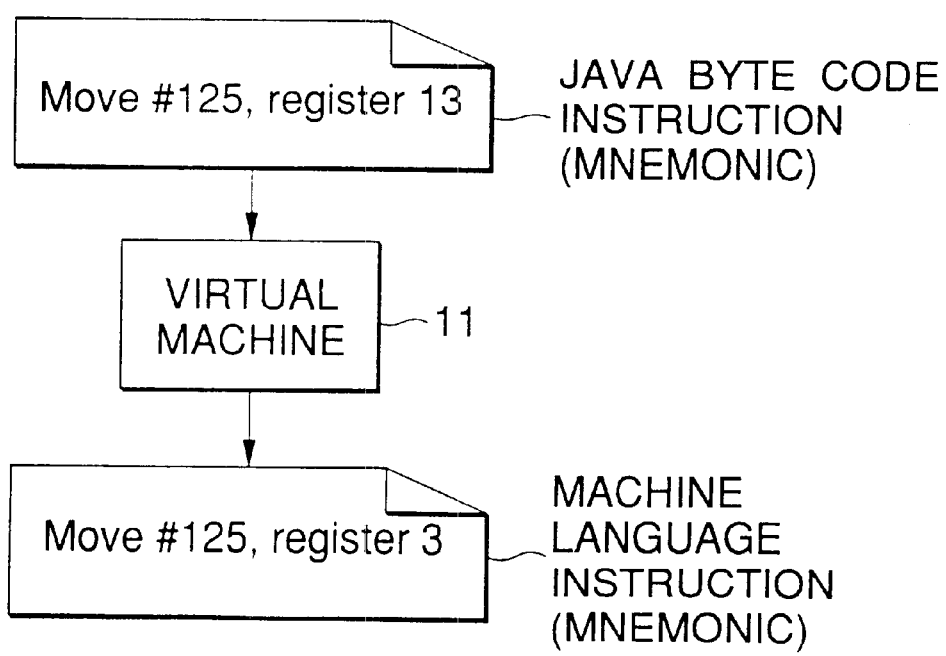
FIGS. 8 and 9A–9B illustrate a process of the Java virtual machine 11.

That is, as shown in FIG. 7, a Java language program that is a source program written in the Java language is compiled into Java byte codes by a Java compiler 21. The Java byte codes are input to the Java virtual machine 11, where they are converted into machine language codes that can be interpreted by the actual computer 1 (central processing unit 2). More specifically, for example, as shown in FIG. 8, when an instruction (Java byte code instruction) "move #125, register 13" described in Java byte codes and meaning "set numeral "125" in the register 13" is input to the Java virtual machine 11, the Java virtual machine 11 converts it into an instruction (machine language instruction) "move #125, register 3" described in machine language codes.

Figure 9A:
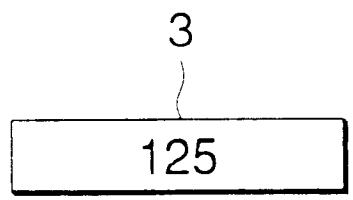

In the computer 1, numeral "125" is set in the register 3 of the computer 1 as shown in FIG. 9A as a result of execution of the instruction written in machine language codes.

Figure 9B:
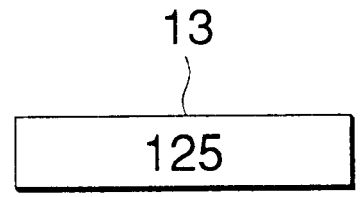

As described above, the register 13 of the Java virtual machine 11 is mapped to the register 3 of the computer 1. Therefore, setting numeral "125" in the register 3 of the computer 1 means setting numeral "125" in the register 13 when viewed from the Java virtual machine 11 as shown in FIG. 9B.

In the above manner, a Java byte code instruction that is input to the Java virtual machine 11 is converted into machine language codes for the computer 1 and then executed as a manipulated on a resource of the computer 1 that is mapped to a resource of the Java virtual machine 11. When viewed from the Java virtual machine 11, the above manipulation corresponds to a manipulation on the resource of the Java virtual machine 11; execution of the former manipulation means execution of the Java byte code instruction.

Therefore, as described above, by implementing a Java virtual machine on an actual computer, a compiled Java program can be executed irrespective of the CPU (central processing unit) and the OS used in the computer.

An example of a technique for converting Java byte codes into machine language codes and executing the latter is an interpreter scheme in which interpretation of instructions into machine language codes and execution of the machine language codes are performed one by one as in the case of executing a Basic language program. Another example is a JIT (just in time) compiler scheme in which interpretation of instructions into machine language codes and execution of the machine language codes are performed en bloc.

The interpreter scheme employed in executing a Basic language program is different from that used in interpreting Java byte codes in that source codes are interpreted in the former scheme whereas intermediate codes (Java byte codes) are interpreted in the latter scheme. However, these two schemes are not discriminated in this embodiment (it is not necessary to do so).

FIG. 10 shows an example of configuration of an embodiment of a program providing system according to the invention (the term "system" means a collection of a plurality of devices that are logically related to each other; whether the devices are accommodated physically in a single chassis is irrelevant).

In this program providing system, when a software developer distributed to a user an application program that is not certified by a program certificate authority, execution of the application program on a user terminal 33 of the user is restricted.

For example, when a software developer has developed an application program that operates on a Java virtual machine as a program execution environment that was developed by the program certificate authority or a party who requested the program certificate authority to certify programs and desires distribution of the application program, the software developer makes a license contract to such an effect with the program certificate authority. Once the license contract has been made, the program certificate authority delivers, as a certificate, to the software developer a key to be used for encryption of the application program or addition of a signature to it.

Specifically, in this embodiment, it is assumed that encryption of the application program or addition of a signature to it is performed according to a publicized key encryption scheme as typified by the RSA scheme (devised by the three researchers of MIT; RSA is from the initials of their names). In this case, a set of secret key-A to be used for encryption according to the publicized key encryption scheme and publicized key-A to be used for decoding a result of encryption that has used secret key-A is delivered to the software developer.

A software developer server 31 of the software developer and a program certificate authority server 32 of the program certificate authority can communicate with each other through a network 34 that is the Internet, public lines, a CATV network, a ground wave network, a satellite network, or the like. Secret key-A and publicized key-A are delivered through the network 34, for instance.

Secret key-A and publicized key-A may be prepared by a software developer itself rather than prepared by the program certificate authority and delivered to a software developer who has been licensed.

After being given secret key-A and publicized key-A, the software developer transmits publicized key-A from the software developer server 31 to the program certificate authority server 32 via the network 34, for instance.

Upon reception of publicized key-A from the software developer server 31, the program certificate authority server 32 encrypts it and transmits publicized key-A that has been encrypted (hereinafter referred to as "encrypted publicized key" where appropriate) to the software developer server 31 via the network 34.

In the program certificate authority server 32, publicized key-A is encrypted according to a publicized key encryption scheme. That is, in the program certificate authority server 32, a set of secret key-B to be used for encryption and publicized key-B to be used for decoding a result of encryption that has used secret key-B is prepared and publicized key-A is encrypted by using secret key-B.

On the other hand, in the software developer server 31, the encrypted publicized key-A transmitted from the program certificate authority server 32 is received and encryption of the application program or addition of a signature to it is performed by using secret key-A. The application program that has been encrypted or to which the signature has been added is stored so as to be correlated with the encrypted publicized key-A.

Upon receiving a request for the application program from the user terminal 33 via the network 34, for instance, the software developer server 31 transmits the application program (that is encrypted or to which a signature has been added as described above) to the user terminal 33 via the network 34 together with the corresponding encrypted publicized key-A.

A Java virtual machine as a program execution environment that has been developed by the program certificate authority or a party who requested to the program certificate authority to certify programs is implemented in the user terminal 33, as explained below. The program certificate authority server 32 stores a program execution system (i.e., a program for allowing a computer (user terminal 33) to operate as a program execution environment) as a Java program execution environment including a Java virtual machine that is provided by the program certificate authority. When the user requests the program certificate authority server 32 to send the program execution system by manipulating the user terminal 33, the program certificate authority server 32 transmits the program execution system to the user terminal 33 via the network 34, for instance. In this manner, the program execution system provided by the program certificate authority is implemented in the user terminal 33.

The program certificate authority server 32 transmits, to the user terminal 33, publicized key-B together with the program execution system. The received publicized key-B is stored in the user terminal 33.

In the user terminal 33 as a Java virtual machine in which the program execution system is implemented, an application program that has been transmitted from the software developer server 31 is executed normally only when it is certified by the program certificate authority.

That is, in the user terminal 33, the encrypted publicized key-A that has been transmitted from the software developer server 31 is decoded into publicized key-A by using publicized key-B that has been transmitted from the program certificate authority server 32. Further, in the user terminal 33, an encrypted application program that has been transmitted from the software developer server 31 is decoded by using publicized key-A thus obtained. The decoded application program is executed on the Java virtual machine. Or the legitimacy of a signature that is added to an application program that has been transmitted from the software developer server 31 is checked by using publicized key-A. The application program is executed on the Java virtual machine only when the legitimacy of the signature is confirmed.

Therefore, if a key to be decoded by using publicized key-B is not the encrypted publicized key-A, i.e., the legitimate one, publicized key-A cannot be obtained as a decoding result. Even if the application program is decoded by using such a decoding result, there cannot be obtained an application program that is normally processed on the Java virtual machine; that is, the Java virtual machine does not operate correctly.

Similarly, when a signature is checked by using a key that is not publicized key-A, the legitimacy of the signature is denied. The application program cannot be executed on the Java virtual machine either.

As described above, where an application program that has been transmitted from the software developer server 31 is not certified by the program certificate authority, it cannot be executed (at least normally) on the user terminal 33 as the Java virtual machine.

As a result, a party who has developed and distributed a Java virtual machine as a program execution environment can restrict unauthorized distribution of an application program that was developed by a third party and is executed on the Java virtual machine. For example, the former party can permit distribution of application programs to only licensed software developers.

In the above example, after acquiring publicized key-A, secret key-A, and the encrypted publicized key-A, the software developer can freely distribute application programs that can be executed on the Java virtual machine implemented in the user terminal 33. Therefore, the software developer need not do cumbersome work of transmitting each newly developed application program to the program certificate authority server 32 to have it certified.

However, there may occur a case that the program certificate authority wants to restrict the use of publicized key-A, secret key-A, and an encrypted publicized key-A by a software developer to several programs. For example, this can be done by the program certificate authority's changing secret key-B that is used for encrypting publicized key-A. (In this case, the program certificate authority needs to distribute a publicized key corresponding to a new secret key to users.) Alternatively, the above object can be attained in the following manner without making the above change. If the program certificate authority assigns respective software developers unique publicized keys-A and secret keys-A, it can identify a software developer who has distributed a certain application program by referring to a ciphered publicized key-A or a signature. For example, the program certificate authority can easily identify a software developer who has distributed application programs the number of which exceeds a number that is prescribed in a license contract to the effect that the use of publicized key-A, secret key-A, and a ciphered publicized key-A is limited to the above number of programs.

Software developers can distribute an application program to users by recording it on a recording medium 35 such as a CD (compact disc)-ROM or a magnetic disk and, for instance, sending it by mail or selling it over the counter. Even in this case, as in the above-described example, such an application program cannot be executed in the user terminal 33 as a Java virtual machine if the application program is not certified by the program certificate authority.

Although in the above example the data (publicized key-A, secret key-A, and the ciphered publicized key-A) are exchanged between the software developer and the program certificate authority via the network 34, the data exchange may also be done by, for instance, sending a recording medium (not shown) on which the data are recorded by mail.

Similarly, the program certificate authority may supply users with the program execution system and publicized key-B by recording those on a recording medium 36 such as a CD-ROM or a magnetic disk and, for instance, sending it by mail or selling it over the counter.

Further, although in the embodiment of FIG. 10 the software developer server 31, the program certificate authority server 32, and the user terminal 33 are each provided by one, they may each be provided in plurality.

Figure 11:
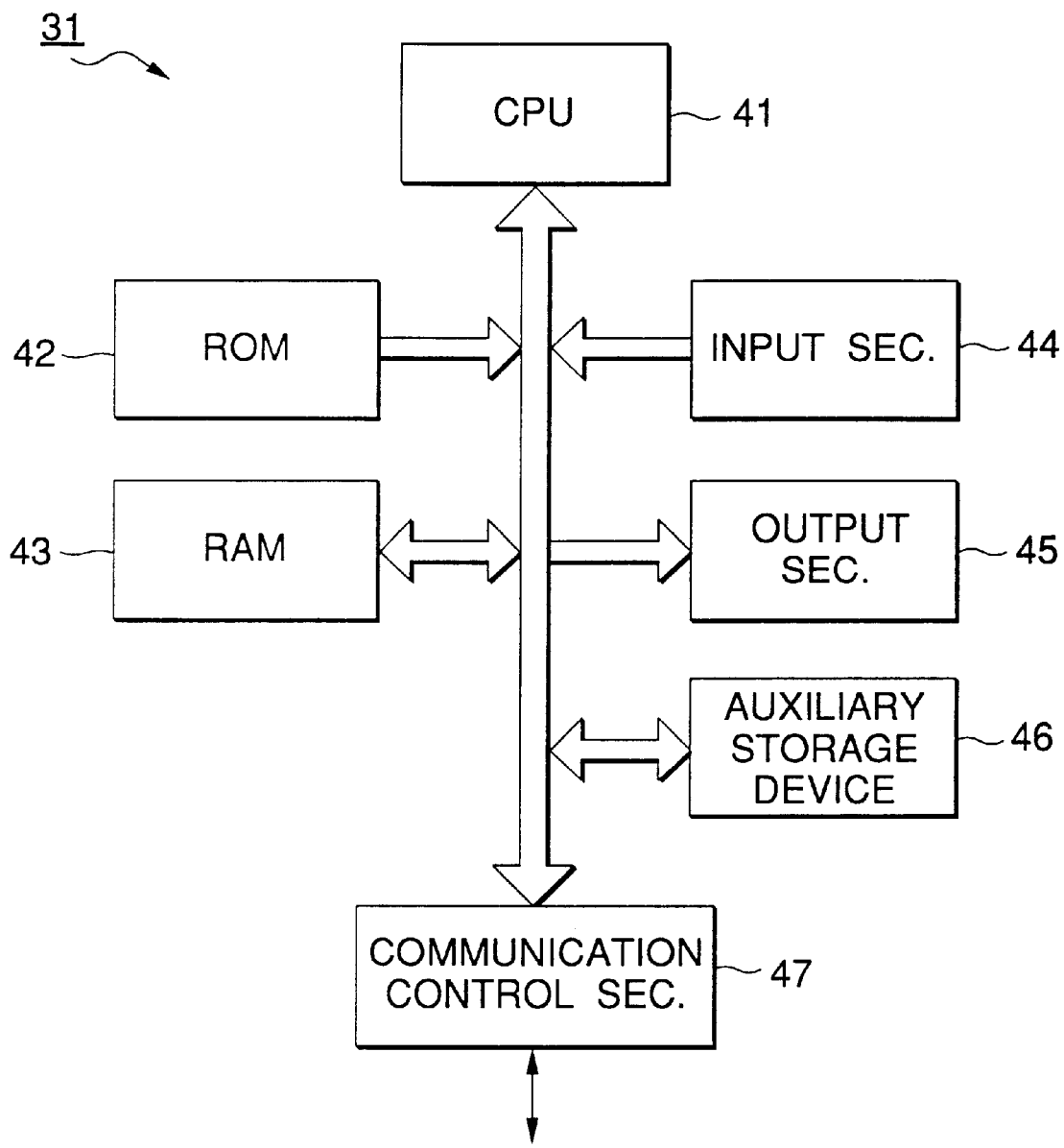
FIG. 11 is a block diagram showing an example of configuration of a software developer server 31 shown in FIG. 10.

FIG. 11 shows an example of configuration of the software developer server 31 shown in FIG. 10.

A CPU 41 executes various kinds of processes by executing programs stored in an auxiliary storage device 46 under the control of an operating system that is stored (recorded) in the auxiliary storage device 46. A ROM (read-only memory) 42 stores an IPL (initial program loading) program and other programs. A RAM (random access memory) 43 stores a program to be executed by the CPU 41 and data necessary for operation of the CPU 41. An input section 44, which is a keyboard or a mouth, for instance, is manipulated in inputting a desired command or data, or the like. An output section 45, which is a display device or a printer, for instance, displays or prints necessary information. The auxiliary storage device 46, which is a hard disk drive, for instance, stores the operating system and other programs to be executed by the CPU 41, as well as execution results of the CPU 41 and other necessary data. A communication control section 47 controls communications that are performed via the network 34.

Figure 12:
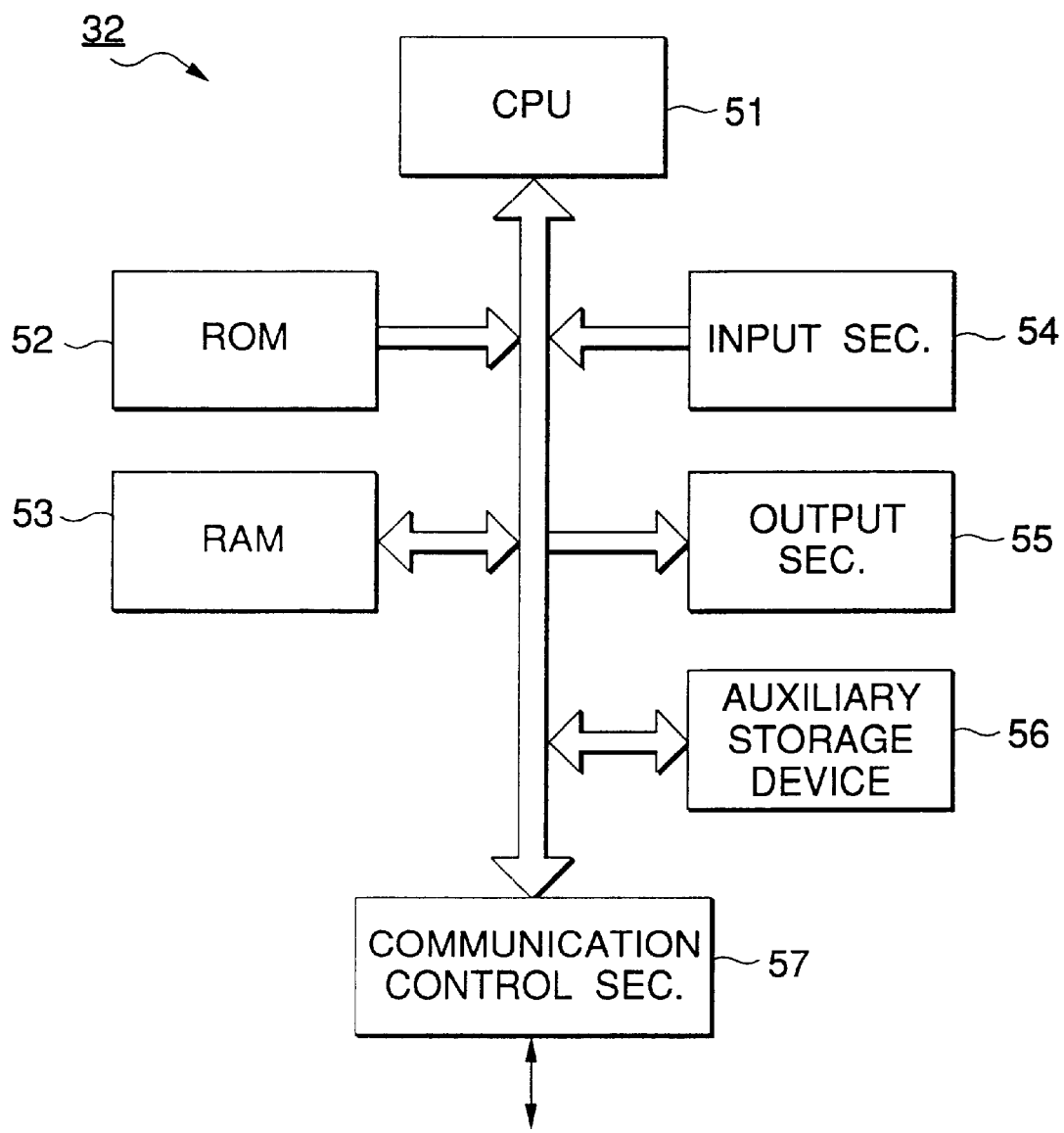
FIG. 12 is a block diagram showing an example of configuration of a program certificate authority server 32 shown in FIG. 10.
Figure 13:
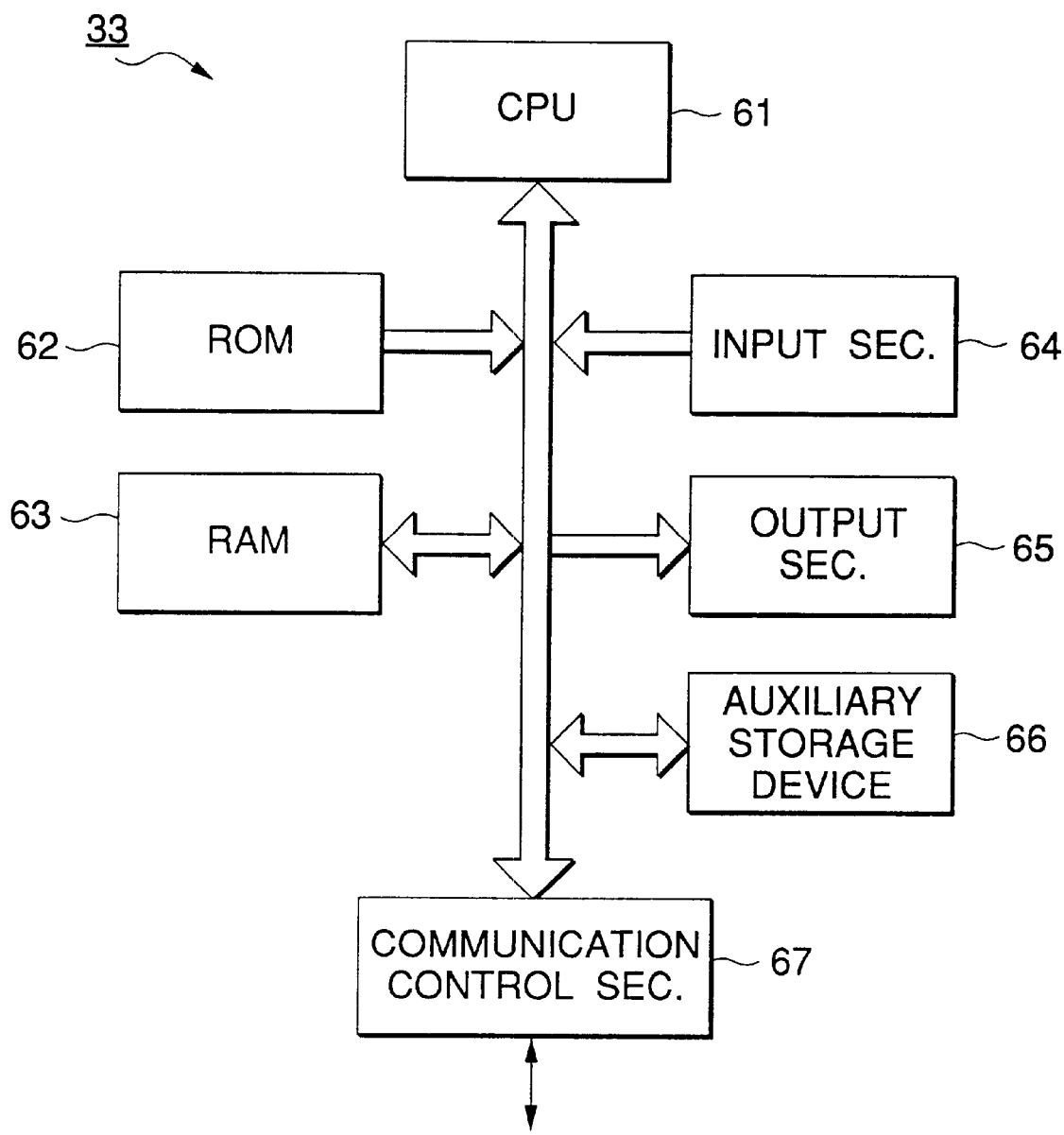
FIG. 13 is a block diagram showing an example of configuration of a user terminal 33 shown in FIG. 10.

FIG. 12 shows an example of configuration of the program certificate authority server 32 shown in FIG. 10 and FIG. 13 shows an example of configuration of the user terminal 33 shown in FIG. 10.

The program certificate authority server 32 is composed of a CPU 51 to a communication control section 57 and the user terminal 33 is composed of a CPU 61 to a communication control section 67. Since the above components are configured in the same manner as the CPU 41 to the communication control section 47 of FIG. 11, descriptions therefor are omitted.

Next, a description will be made of the encryption/decoding according to the above-mentioned publicized key encryption scheme as one method of encrypting/decoding publicized key-A or an application program.

Figure 14:
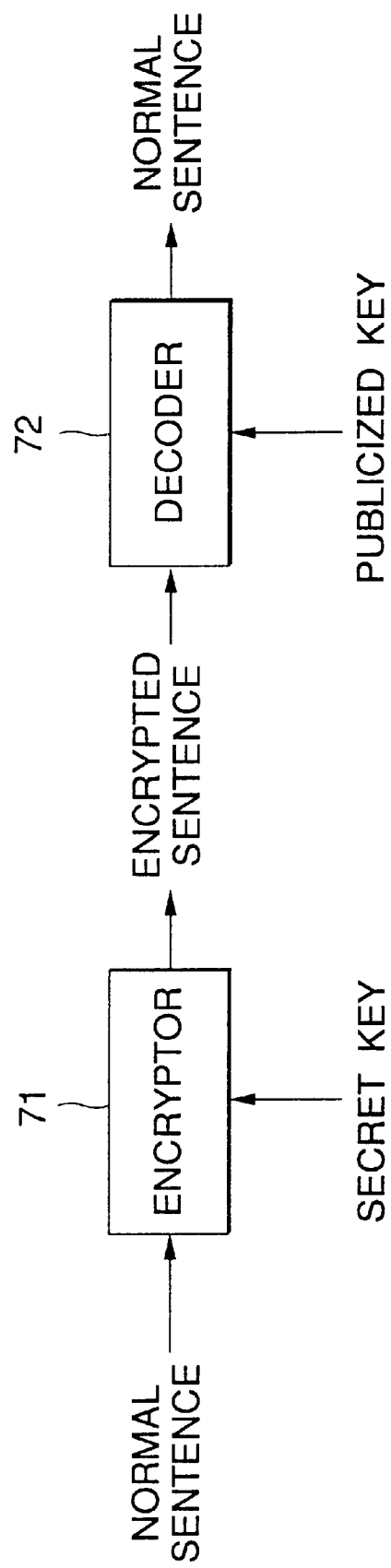
FIG. 14 is a block diagram showing an example of configuration of an encryption/decoding system.

FIG. 14 shows an example of configuration of an encryption/decoding system according to the publicized key encryption scheme.

A normal sentence as a subject of encryption is input to an encryptor 71. The encryptor 71 encrypts the normal sentence into an encrypted sentence by using an encryption key that is called a secret key and is unique to each person.

On the other hand, an encrypted sentence produced by the encryptor 71 is input to a decoder 72. The decoder 72 decodes the encrypted sentence into the original normal sentence by using a decoding key called a publicized key and is open to the public.

Like the encryptor 71, the software developer server 31 encrypts Java byte codes as an application program by using secret key-A. Further, like the encryptor 71, the program certificate authority server 32 encrypts publicized key-A that is transmitted from the software developer server 31 by using secret key-B.

On the other hand, like the decoder 72, the user terminal 33 decodes the encrypted publicized key-A by using publicized key-B and further decodes the encrypted application program by using the thus-decoded publicized key-A.

The encryption/decoding method is not limited to the publicized key encryption scheme and other schemes such as the common key encryption scheme as typified by the DES (data encryption standard) scheme (developed by IBM Corp. and put into practical use as a standard of the U.S. government) may also be used. In the common key encryption scheme, encryption/decoding is performed by using a common key that is not open to any parties other than the parties concerned. In the publicized key encryption scheme, a secret key for encryption is different from a publicized key for decoding (conversely, a publicized key and a secret key may be used for encryption and decoding, respectively). In contrast, in the common key encryption scheme, the same, common key is used for both encryption and decoding. Therefore, it is necessary to keep the common key secret from parties other than the parties concerned.

Next, a description will be made of a signature addition method according to the publicized key encryption scheme as one method of adding a signature (digital signature) to an application program.

Figure 15:
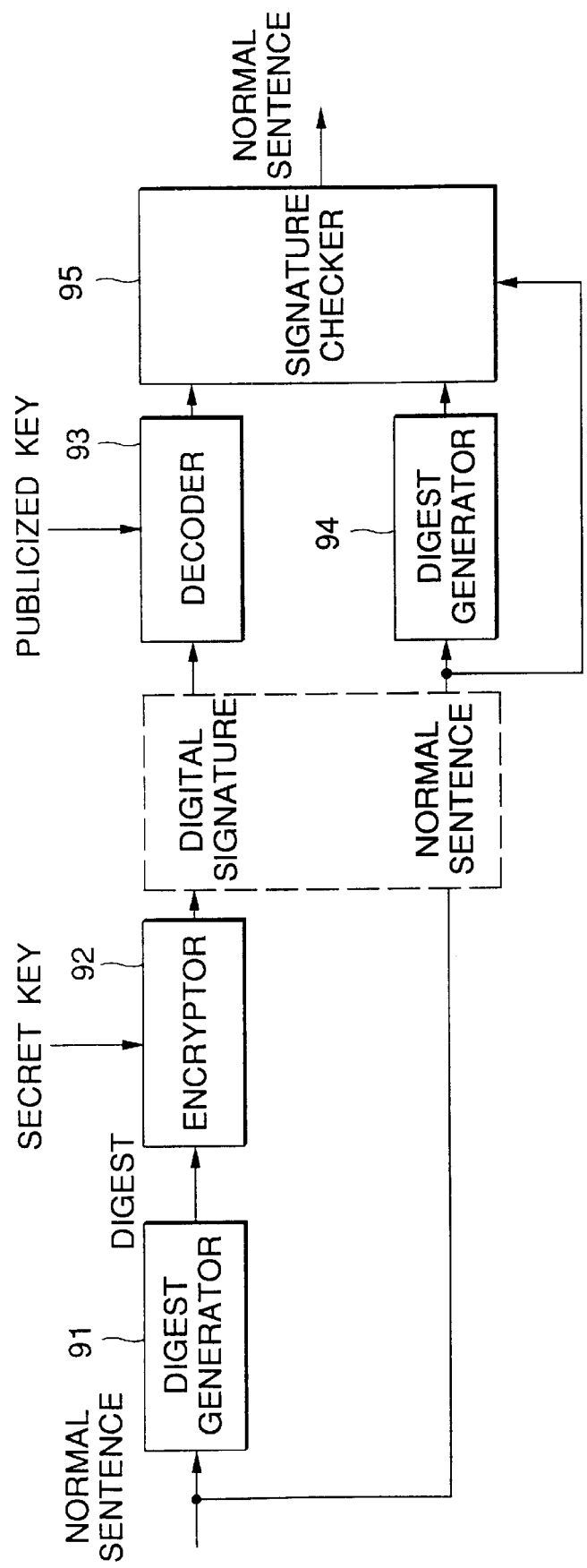
FIG. 15 is a block diagram showing an example of configuration of an encryption/decoding system using a digital signature.

FIG. 15 shows an example of configuration of an encryption/decoding system according to the publicized key encryption scheme for generating/checking a signature.

A normal sentence as a subject of encryption is input to a digest generator 91, which generates a digest of the received normal sentence according to such an algorithm as MD5 (MD: MessageDigest) or SHA-1 (SHA: secure hash algorithm). The MessageDigest class is an engine class designed to provide the functionality of cryptographically secure message digests such as SHA-1 or MD5. A cryptographically secure digest takes arbitrary-sized input (a byte array), and generates a fixed-size output, called a digest. A digest has the following properties. It should be computationally infeasible to find another input string that will generate the same digest. The digest does not reveal anything about the input that was used to generate it. Message digests are used to produce unique and reliable identifiers of data. They are sometimes called the "digital fingerprints" of data.

A digest corresponds to a mechanically condensed sentence of a normal sentence, and different digests are generated for different normal sentences as inputs. A digest is generated by converting a normal sentence by using a hash function, for instance.

Incidentally, a method of mapping a set of ranges that can be taken by a keyword used for searching a database to a certain limited numerical range (corresponding to a record number or a suffix of an array) is called hashing. A transformation function of this mapping is a hash function.

The digest generated by the digest generator 91 is supplied to an encryptor 92. The encryptor 92 encrypts the digest by using a secret key, for instance, like the encryptor 71 shown in FIG. 14, and outputs an encrypted digest as a digital signature. The digital signature is added to the original normal sentence and a resulting signature-added normal sentence is output.

On the other hand, the digital signature as part of the signature-added normal sentence is input to a decoder 93 and the sentence as the remaining part is input to a digest generator 94. The decoder 93 decodes the digital signature into a digest by using a publicized key, for instance, like the decoder 72 shown in FIG. 14. The digest thus obtained is supplied to a signature checker 95.

Like the digest generator 91, the digest generator 94 generates a digest of the received normal sentence and supplies it to the signature checker 95.

The signature checker 95 judges legitimacy of the signature (digital signature), i.e., checks the signature. Specifically, the signature checker 95 checks whether the digest that is output from the decoder 93 coincides with the digest that is output from the digest generator 94. If the two digests do not coincide with each other, the legitimacy of the signature is denied with a judgment that, for instance, the normal sentence has been falsified or the publicized key used in the decoder 93 is not a correct one.

On the other hand, if the digest that is output from the decoder 93 coincides with the digest that is output from the digest generator 94, the legitimacy of the signature is confirmed with a judgment that the normal sentence has not been falsified or the publicized key used in the decoder 93 is a correct one.

The signature checker 95 is also supplied with the normal sentence that constitutes the signature-added normal sentence. The signature checker 95 outputs the normal sentence when the legitimacy of the signature is confirmed.

Where a signature of an application program is added to the application program in the software developer server 31, a signature (digital signature) is generated by generating a digest of the application program and then encrypting the digest by using secret key-A in the above-described manner. On the other hand, in the user terminal 33, the signature is decoded into a digest by using publicized key-A and a digest is generated from the application program. The legitimacy of the signature is checked by judging whether the two digests coincide with each other.

A signature serves to identify a party (software developer in this example) who added it. The source of an application program to which a signature is added can easily be determined from its signature. For example, where an application program has a bug or the like, a software developer who distributed such an application program having the bug can easily be found out.

Further, where an application program to which a signature is added has been falsified or infected with what is called a computer virus, a digest that is generated from the application program does not coincide with a digest that is obtained by decoding the signature and hence the legitimacy of the signature is denied. Therefore, an application program that has been falsified or infected with a virus can be prevented from being executed in the user terminal 33.

Secret key-A that is used for generating a signature should be kept secret from third parties (in this example, parties other than the software developer and the program certificate authority), it is difficult for a third party to find a signature generation method even if it tries to decipher an application program.

The signature generation/check method is not limited to the above one that utilizes the publicized key encryption scheme.

Next, a description will be made of processes executed by the software developer server 31, the program certificate authority server 32, and the user terminal 33 in a case where the certification of an application program is performed through encryption that uses secret key-A.

Figure 16:
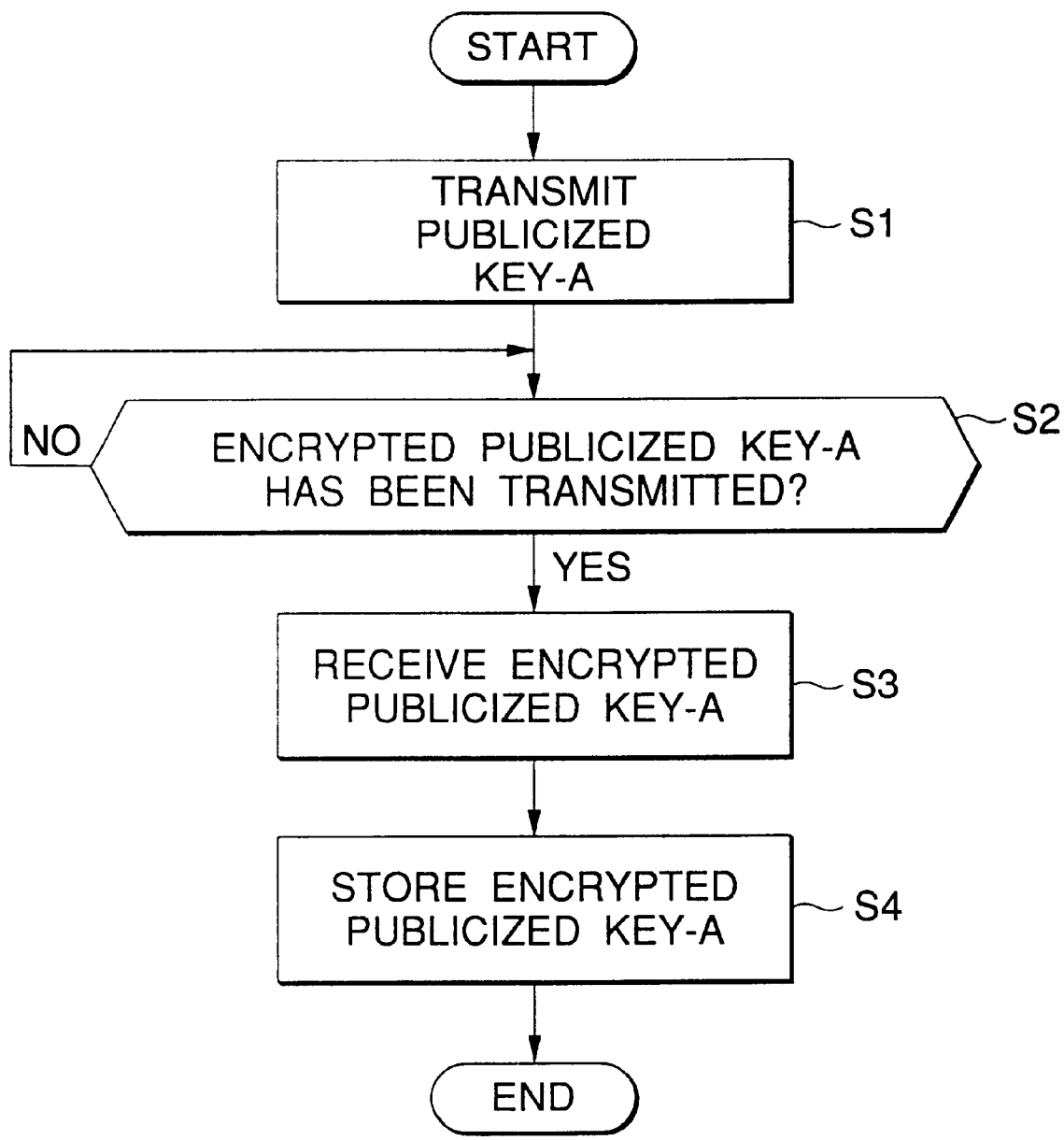
FIG. 16 is a flowchart showing a process of the software developer server 31.

First, a process of the software developer server 31 will be described with reference to flowcharts of FIGS. 3 and 16.

The software developer makes a license contract with the program certificate authority and acquires publicized key-A and secret key-A by, for instance, requesting the program certificate authority to issue those. In the software developer server 31, first, at step S1 shown in FIG. 16, the communication control section 47 transmits publicized key-A to the program certificate authority server 32 via the network 34 to have it certified by the program certificate authority. The process then goes to step S2, where the CPU 41 judges whether an encrypted publicized key-A as a certified publicized key-A has been transmitted from the program certificate authority server 32. If it is judged that a certified publicized key-A has not been transmitted yet, the process returns to step S2.

If it is judged at step S2 that a certified publicized key-A has been received, the process goes to step S3, where the communication control section 47 receives the encrypted publicized key-A. The process then goes to step S4, where the encrypted publicized key-A received by the communication control section 47 is transferred to the auxiliary storage device 46 and stored there. The process is then finished.

Thereafter, the software developer develops an application program that is executed on a Java virtual machine and it is stored (recorded) in the auxiliary storage device 46, for instance. In the software developer server 31, at step S6 shown in FIG. 3, the CPU 41 complies the application program that is stored in the auxiliary storage device 46 into Java byte codes according to a Java compiler program. The Java byte codes are also supplied to the auxiliary storage device 46 and stored there.

The process then goes to step S7, where the CPU 41 encrypts the Java byte codes that were obtained by the compilation at step S6 by using secret key-A, for instance, in the manner described above in connection with FIG. 14, to produce encrypted byte codes. At step S8, the encrypted byte codes are stored in the auxiliary storage device 46 so as to be correlated with the encrypted publicized key-A. The process is then finished.

Figure 17:
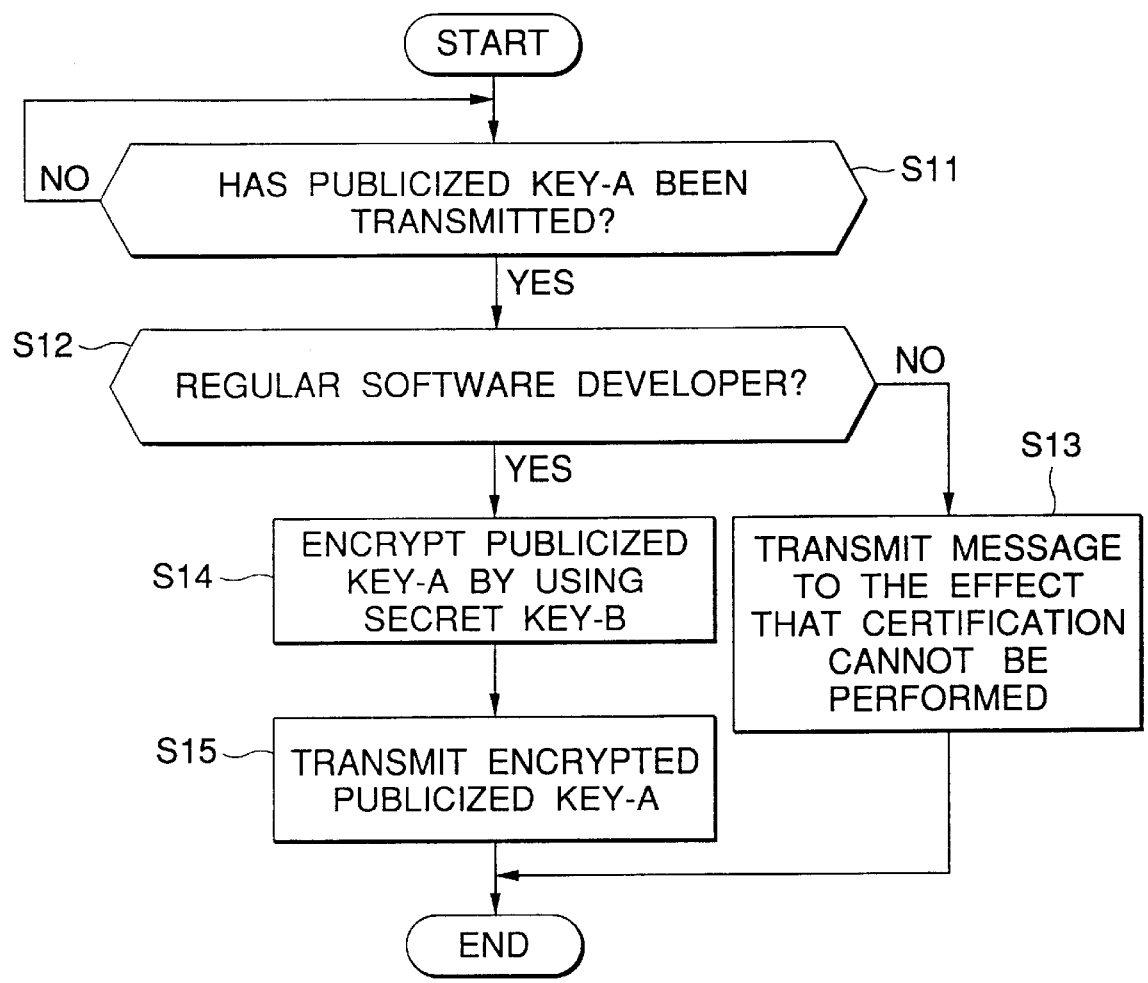
FIG. 17 a flowchart showing a process of the program certificate authority server 32.

Next, a process of the program certificate authority server 32 will be described with reference to a flowchart of FIG. 17.

For example, the program certificate authority is a party who developed a Java virtual machine as a program execution environment or an organization that is requested by that party to act on its behalf. For example, the program certificate authority server 32 executes a certification process for certificating publicized key-A as certification of an application program of a licensed party.

Specifically, this is done in the following manner. First, at step S11, the CPU 51 of the program certificate authority server 32 judges whether publicized key-A as a subject of certification has been transmitted from, for instance, the software developer server 31 via the network 34. If it is judged that publicized key-A has not been transmitted, the process returns to step S11. If it is judged at step S11 that publicized key-A has been transmitted, the process goes to step S12, where the CPU 51 judges whether the received publicized key-A is one from a licensed, i.e., regular, software developer.

When the program certificate authority has made, with a software developer, a license contract that permits the software developer to, for instance, develop and distribute an application program that is executed on the Java virtual machine, it issues, for instance, an ID and a password to the software developer. The ID and the password that were issued at the time of license contract are transmitted from the licensed, i.e., regular, software developer together with publicized key-A as a subject of certification. At step S12, the judgment as to whether publicized key-A is from a regular software developer is made based on these ID and password.

If it is judged at step S12 that publicized key-A is not from a regular software developer, that is, when publicized key-A has been transmitted from a software developer with whom no license contact is made, the process goes to step S13, where the communication control section 57 transmits, to the software developer, a message to the effect that publicized key-A cannot be certified unless a license contact is made. The process is then finished.

On the other hand, if it is judged at step S12 that publicized key-A is from a regular software developer, the process goes to step S14, where the CPU 51 encrypts the received publicized key-A into an encrypted publicized key-A. Publicized key-A is thus certified.

The process then goes to step S15, where the communication control section 57 transmits the encrypted publicized key-A as a certification result of publicized key-A to the software developer who transmitted publicized key-A (in this example, the software developer server 31) via the network 34. The process is then finished.

FIG. 1 shows an example of functional configuration of a program execution system as a program execution environment for executing an application program in the user terminal 33.

An input section 81 accepts encrypted byte codes (encrypted Java byte codes) and an encrypted publicized key-A as well as a publicized key-B, and supplies the encrypted byte codes to a decoding section 82 and the encrypted publicized key-A and publicized key-A to a decoding section 84. The decoding section 82 operates as the decoder 72 of FIG. 14. Specifically, the decoding section 82 decodes the encrypted byte codes that are supplied from the input section 81 into the original Java byte codes by using publicized key-A that is output from the decoder 84. The Java byte codes obtained by the decoding section 82 are supplied to a Java virtual machine 83. The Java virtual machine 83 executes a process defined by the Java byte codes that are supplied from the decoding section 82. Like the decoding section 82, the decoding section 84 operates as the decoder 72 of FIG. 14. Specifically, the decoding section 84 decodes, into publicized key-A, the encrypted publicized key-A that is supplied from the input section 81 by using publicized key-B that is also supplied from the input section 81, and supplies the resulting publicized key-A to the decoding section 82.

In the above-configured program execution system, first, the input section 81 acquires encrypted byte codes and an encrypted publicized key-A as well as a publicized key-B. For example, where encrypted byte codes and an encrypted publicized key-A have been transmitted in advance from the software developer server 31 via the network 34 and are stored as files in the auxiliary storage device 66, or where a recording medium 35 on which the encrypted byte codes and the encrypted publicized key-A are recorded as files is set in the user terminal 33, the input section 81 opens those files and reads out the encrypted byte codes and the encrypted publicized key-A.

Consider a case where the software developer server 31 is connected to the Internet as the network 34. Where encrypted byte codes and an encrypted publicized key-A are correlated with a URL (uniform resource locator) in such a software developer server 31, the input section 81 receives the encrypted byte codes and the encrypted publicized key-A that are transmitted from the software developer server 31 via the network 34 when the user specifies the URL by manipulating the input section 64.

Consider another case where the software developer server 31 digitally broadcasts encrypted byte codes and an encrypted publicized key-A by ground waves or through a satellite network as the network 34. In this case, the input section 81 receives the encrypted byte codes and the encrypted publicized key-A that are broadcast.

In a similar manner, the input section 81 acquires publicized key-B that is issued from the program certificate authority.

Among the encrypted byte codes, the encrypted publicized key-A, and publicized key-B, the input section 81 supplies the encrypted byte codes to the decoding section 82 and the encrypted publicized key-A and publicized key-B to the decoding section 84.

The decoding section 84 decodes, into publicized key-A, the encrypted publicized key-A that is supplied from the input section 81 by using publicized key-B that is also supplied from the input section 81, and supplies the resulting publicized key-A to the decoding section 82. The decoding section 82 decodes the encrypted byte codes that are supplied from the input section 81 by using publicized key-A that is supplied from the decoding section 82, and supplies Java byte codes as a decoding result to the Java virtual machine 83. The Java virtual machine 83 interprets and executes the Java byte codes that are supplied from the decoding section 82.

As described above, the decoding section 84 decodes the encrypted publicized key-A into publicized key-A by using publicized key-B corresponding to (paired with) secret key-B that was used for the encryption in the program certificate authority server 32. Then, the decoding section 82 decodes the encrypted byte codes by using publicized key-A that has been obtained by the decoding section 84 through decoding and corresponds to secret key-B that was used the encryption in the software developer server 31. Java byte codes as a decoding result are input to the Java virtual machine 83.

Therefore, a legitimate publicized key-A cannot be obtained if a key to be decoded by using publicized key-B is not what is called the legitimate encrypted publicized key-A issued from the program certificate authority. (There remains a possibility that a legitimate publicized key-A is accidentally output from the decoding section 84, the possibility is almost equal to zero.) For example, this corresponds to a case where there occurs input of a non-encrypted publicized key-A, an encrypted key-A that was encrypted according to a different algorithm than used in the program certificate authority server 32, or publicized key-A that was encrypted according to the same algorithm as used in the program certificate authority server 32 without using secret key-B that should be used in a regular case. Therefore, even if the encrypted byte codes are decoded by using such a decoding result, there cannot be obtained an application program that can be executed normally on the Java virtual machine 83; the Java virtual machine 83 does not operate correctly. As a result, it becomes possible to restrict distribution of Java byte codes that operate on the Java virtual machine 83 but are not certified by the program certificate authority to users having the user terminal 33 in which the Java virtual machine 83 is implemented.

In the above manner, it becomes possible to allow only software developers who have made a contract with the program certificate authority, to distribute Java byte codes that operate on the Java virtual machine 83 to users having the user terminal 33 in which the Java virtual machine 83 is implemented. The developer or the like of the Java virtual machine 83 can receive license fees for use of the Java virtual machine 83 from software developers who want to distribute Java byte codes that operate on the Java virtual machine 83.

It is necessary to take a measure to allow only the decoding section 82 to input Java byte codes to the Java virtual machine 83. Further, it is desirable to take a measure to allow only the decoding section 84 to input publicized key-A to the decoding section 82.

Upon reception of a certain input, each of the decoding sections 82 and 84 shown in FIG. 1 executes a decoding process with respect to the input and outputs a processing result. Therefore, usually the Java virtual machine 83 runs away when a key other than publicized key-B, Java byte codes that have not been encrypted by using secret key-A, or publicized key-A that has not been encrypted by using secret key-B is input and a decoding result obtained with such a key or Java byte codes is supplied to the Java virtual machine 83. In view of this, a procedure may be employed in which it is checked whether an output of the decoding section 82 is legitimate (normal) Java byte codes and the Java virtual machine 83 is allowed to interpret and execute Java byte codes only when the output of the decoding section 82 is legitimate Java codes. For example, the Java virtual machine 83 may be allowed to interpret and execute Java virtual machine when 32-bit data called "magic" that is located at the head of the Java byte codes has a regular value ("CAFEBABE" in hexadecimal notation), with a judgment that the output of the decoding section 82 is legitimate Java byte codes. The Java virtual machine 83 is thus prevented from running away.

Incidentally, from the viewpoint of restricting execution of an application program on the Java virtual machine 83, there is no problem even if the decoding algorithms of the decoding sections 82 and 84 of FIG. 1 or publicized keys-A and B are known to a party other than licensed parties as long as the encryption algorithms or secret keys-A and B to be used for the encryption are not known. That is, the execution of an application program on the Java virtual machine 83 can be restricted even if the decoding method of an encrypted sentence is known as long as the method of generating encrypted byte codes to be given to the decoding section 82 to supply the Java virtual machine 83 with Java byte codes that can be executed correctly or the method of generating the encrypted publicized key-A to be given to the decoding section 84 is not known.

However, if one knows the decoding method of an encrypted sentence, he can obtain original Java byte codes from encrypted byte codes. Since the contents of Java byte codes can be understood relatively easily by decompiling those, reverse engineering can be done easily.

To prevent such reverse engineering, the decoding method of an encrypted sentence may be kept secret. For example, publicized key-B to be used for decoding the encrypted publicized key-A that has been obtained by encrypting publicized key-A to be used for decoding encrypted byte codes may be kept secret, through it is usually publicized.

Figure 18:
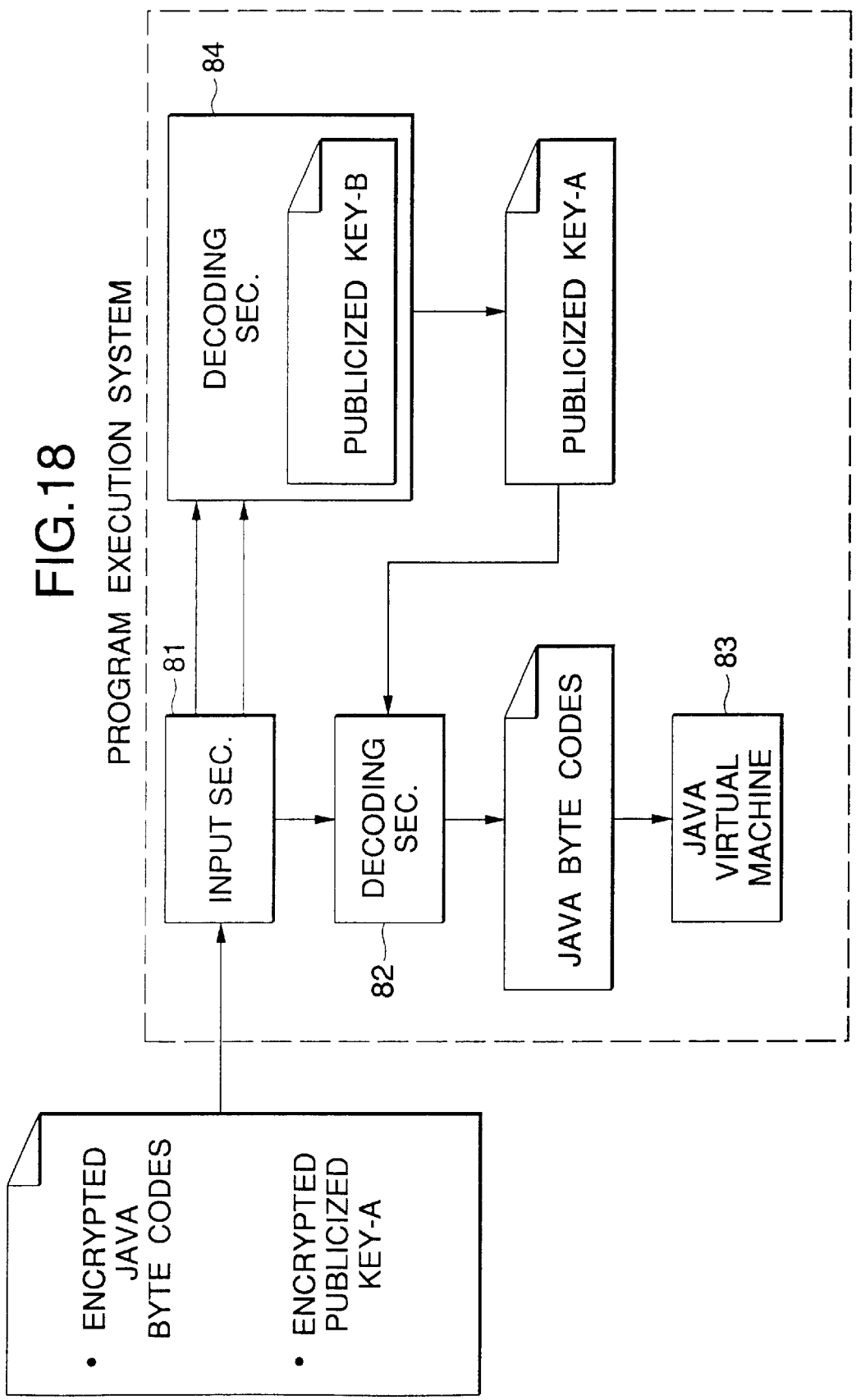
FIG. 18 is a block diagram showing a second example of functional configuration of a program execution system.

FIG. 18 shows an example of configuration of a program execution system in which publicized key-B is kept secret. The components in FIG. 18 having the corresponding components in FIG. 1 are given the same reference numerals as the latter and descriptions therefor will be omitted where appropriate.

In this embodiment, for example, publicized key-B is located at a single position or dispersed at a plurality of positions of a program that constitutes a program execution system including a Java virtual machine 83. A decoding section 84 decodes an encrypted sentence by using such a publicized key-B. Therefore, in this case, publicized key-B never leaks from the program execution system and hence it is possible to prevent an event that an encrypted sentence is illegally decoded and reverse engineering is performed (or the possibility of occurrence of reverse engineering can be reduced).

Next, a description will be made of processes executed by the software developer server 31 and the user terminal 33 in a case where the certification of an application program is performed through addition of a signature that is generated by using secret key-A. In this case, since the program certificate authority server 32 executes a process similar to the process that is executed in the above-described case where an application program is encrypted, a description will be omitted.

Figure 5:
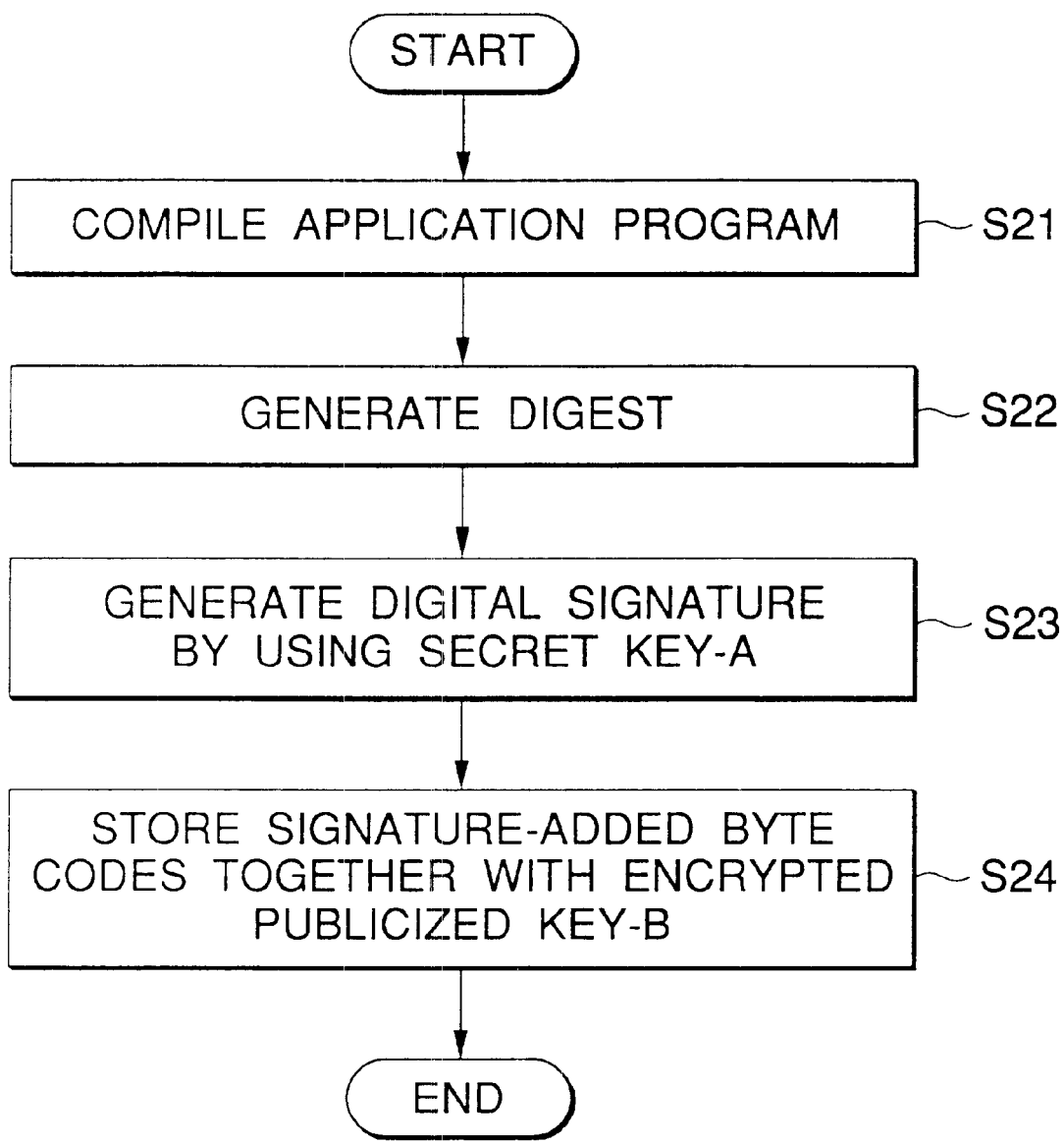
FIG. 5 is a flowchart showing a process of the software developer server 31.

First, a process of the software developer server 31 will be described with reference to a flowchart of FIG. 5. It is assumed that the process described above in connection with the flowchart of FIG. 16 has already been executed in the software developer server 31, whereby an encrypted publicized key-A has been acquired from the program certificate authority. It is also assumed that an application program that is executed on a Java virtual machine has been developed and stored in the auxiliary storage device 46.

Figure 3:
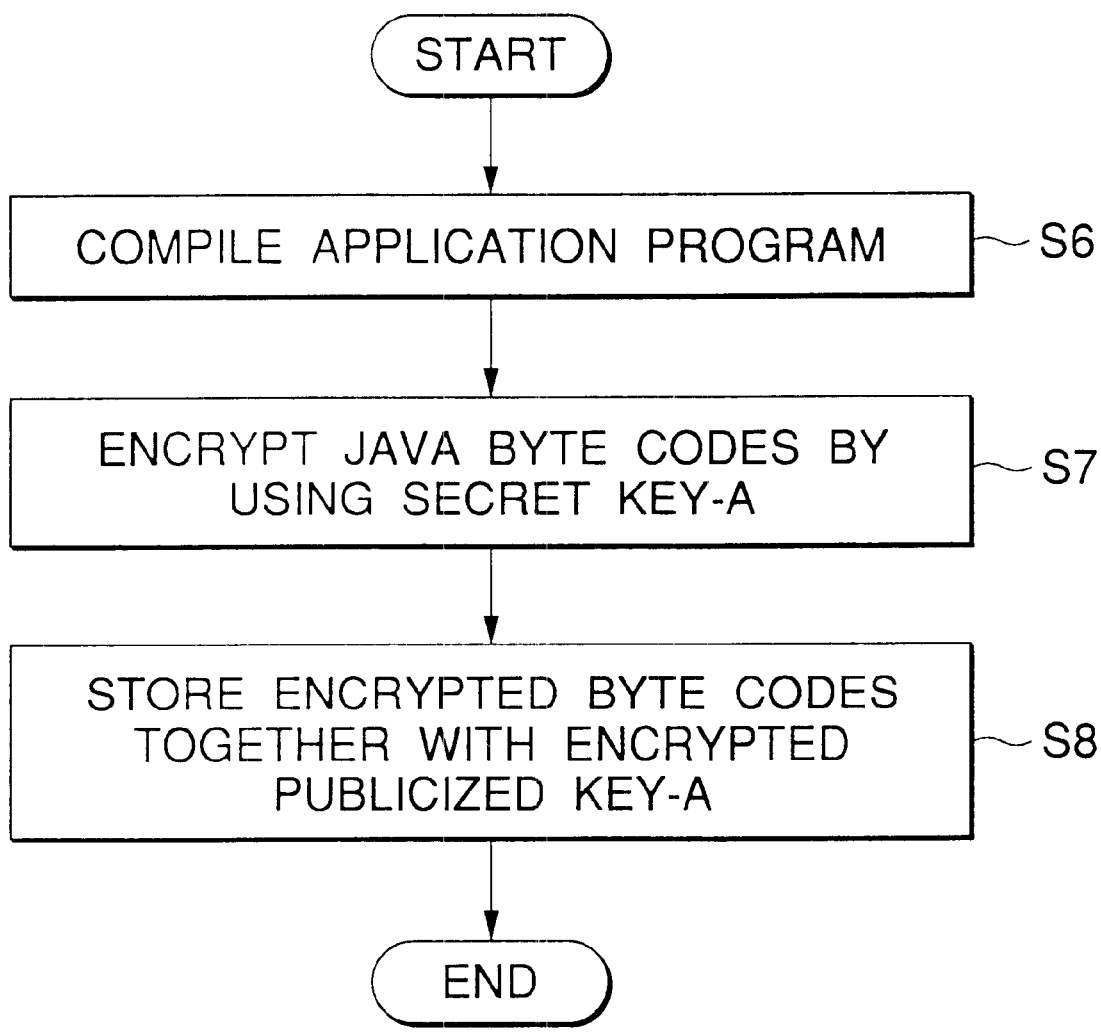
FIG. 3 is a flowchart showing a process of a software developer server 31.

In the software developer server 31, as in the case of step S6 of FIG. 3, the CPU 41 complies the application program stored in the auxiliary storage device 46 into Java byte codes according to a Java compiler program (step S21). The Java byte codes are also supplied to the auxiliary storage device 46 and stored there.

Then, the process sequentially proceeds to step S22 onward, whereby a signature (digital signature) for certifying that the Java byte codes obtained by the compilation at step S21 are legitimate is added to the Java byte codes.

Specifically, at step S22, the CPU 41 generates a digest of the Java byte codes, for instance, in the same manner as the digest generator 91 of FIG. 15 does. The process then goes to step S23, where the CPU 41 encrypts, by using secret key-A, the digest that was generated at step S22 in the same manner as the encryptor 92 of FIG. 15 does, whereby a digital signature is generated. The process then goes to step S24, where the digital signature is added to the Java byte codes. (Java byte codes to which a digital signature is added as in this case will be hereinafter called "signature-added byte codes" where appropriate.) At step S24, the signature-added byte codes are stored in the auxiliary storage device 46 so as to be correlated with an encrypted publicized key-A. The process is then finished.

FIG. 4 shows an example of functional configuration of a program execution system as a program execution environment for checking legitimacy of an application program and executing only a legitimate one in the user terminal 33. The components in FIG. 4 having the corresponding components in FIG. 1 are given the same reference numerals as the latter and descriptions therefor will be omitted where appropriate.

An input section 101 accepts inputs basically in the same manner as the input section 81 of FIG. 1. The input section 101 is different from the latter in that it receives signature-added byte codes (Java byte codes to which a signature (digital signature) is added) instead of encrypted byte codes. The input section 101 separates the signature-added byte codes into a signature and Java byte codes and output those. The signature is supplied to a signature checking section 103 and the Java byte codes are supplied to a message digest system 102 and a virtual machine input control section 104.

The message digest system 102 executes a process that is similar to the process executed by the digest generator 94 of FIG. 15. That is, the message digest system 102 generates a digest from the Java byte codes and supplies it to the signature checking section 103. The signature checking section 103, which corresponds to the decoder 93 and the signature checker 95 of FIG. 15, checks legitimacy of the signature that is supplied from the input section 101.

Specifically, the signature checking section 103 receives the signature from the input section 101 and the digest from the message digest system 102, as well as publicized key-A from a decoding section 84. The signature checking section 103 decodes the signature into a digest by using the received publicized key-A, and checks legitimacy of the signature by comparing the thus-obtained digest with the digest that is supplied from the message digest system 102. Further, the signature checking section 103 controls the virtual machine input control section 104 in accordance with a check result.

The virtual machine input control section 104 controls, under the control of the signature checking section 103, supply to the Java virtual machine 83 of the Java byte codes that are supplied from the input section 101.

In the above-configured program execution system, first, the input section 101 acquires signature-added byte codes and an encrypted publicized key-A as well as publicized key-B in the same manner as the input section 81 of FIG. 1. Then, the input section 101 separates the signature-added byte codes into a signature and Java byte codes, and supplies the signature to the signature checking section 103 and the Java byte codes to the message digest system 102 and the virtual machine input control section 104. Further, the input section 101 supplies the encrypted publicized key-A and publicized key-B to the decoding section 84. As described above in connection with FIG. 1, the decoding section 84 decodes the encrypted publicized key-A into publicized key-A by using publicized key-B and supplies the obtained publicized key-A to the signature checking section 103.

On the other hand, the message digest system 102 generates a digest from the Java byte codes that are supplied from the input section 101 and supplies the digest to the signature checking section 103. The signature checking section 103 decodes the signature that is supplied from the input section 101 into a digest by using publicized key-A that is supplied from the decoding section 84. Further, the signature checking section 103 compares the digest obtained by the decoding with the digest that is supplied from the message digest system 102, and judges the legitimacy of the signature that is supplied from the input section 101 based on whether the two digests coincide with each other.

If the legitimacy of the signature has been affirmed, that is, if the digest obtained by decoding the signature coincides with the digest supplied from the message digest system 102, the signature checking section 103 controls the virtual machine input control section 104 so that the Java byte codes that are supplied from the input section 101 are output to the Java virtual machine 83. The virtual machine input control section 104 supplies the Java virtual machine 83 with the Java byte codes that are supplied from the input section 101 under the control of the signature checking section 103.

Therefore, in this case, the Java virtual machine 83 interprets and executes the Java byte codes that are supplied from the input section 101 via the virtual machine input control section 104.

On the other hand, if the legitimacy of the signature has not been affirmed, that is, if the digest obtained by decoding the signature does not coincide with the digest supplied from the message digest system 102, the signature checking section 103 controls the virtual machine input control section 104 so that the Java byte codes that are supplied from the input section 101 are not output to the Java virtual machine 83.

In this case, the virtual machine input control section 104 does not output, to the Java virtual machine 83, the Java byte codes that are supplied from the input section 101. Therefore, the Java virtual machine 83 does not execute any process.

As described above, also in the case where a signature is added to certify an application program, it becomes possible to restrict distribution of Java byte codes that operate on the Java virtual machine 83 but are not certified by the program certificate authority to users having the user terminal 33 in which the Java virtual machine 83 is implemented. That is, it becomes possible to allow only software developers who have made a contract with the program certificate authority, to distribute Java byte codes that operate on the Java virtual machine 83 to users having the user terminal 33 in which the Java virtual machine 83 is implemented. The developer of the Java virtual machine 83 can receive license fees for use of the Java virtual machine 83 from software developers who want to distribute Java byte codes that operate on the Java virtual machine 83.

As described above, in the case of adding a signature, it also becomes possible to, for instance, restrict execution on the Java virtual machine 83 of a falsified version of signature-added Java byte codes.

In the embodiment of FIG. 4, it is necessary to take a measure to allow only the virtual machine input control section 104 to input Java byte codes to the Java virtual machine 83. Further, it is desirable to take a measure to allow only the decoding section 84 to input publicized key-A to the signature checking section 103.

It is noted that Java byte codes themselves exist in the case where a signature is added to Java byte codes, unlike the case where Java byte codes are encrypted. Therefore, in a program execution system that does not check the legitimacy of a signature (for example, in a program execution system in which Java byte codes as output from the input section 101 are directly input to the Java virtual machine 83), Java byte codes can be interpreted and executed without any limitations.

Conversely, in the case where a signature is added to Java byte codes, a developer and a seller of a Java virtual machine, a seller who sells a Java virtual machine as implemented in the user terminal 33, and like parties may configure a program execution system as shown in FIG. 4. A party who does not want to restrict the execution of Java byte codes may configure a program execution system in which the legitimacy of a signature is not checked.

In the embodiment of FIG. 10, the program certificate authority provides a program execution system as software (i.e., a program for causing the user terminal 33 to function as a program execution system) to users in such a manner that it can be implemented in the user terminal 33 as it is. This program execution system may also be provided in such a manner that it is encrypted or a signature is added to it, like an application program provided by a software developer.

Figure 19:
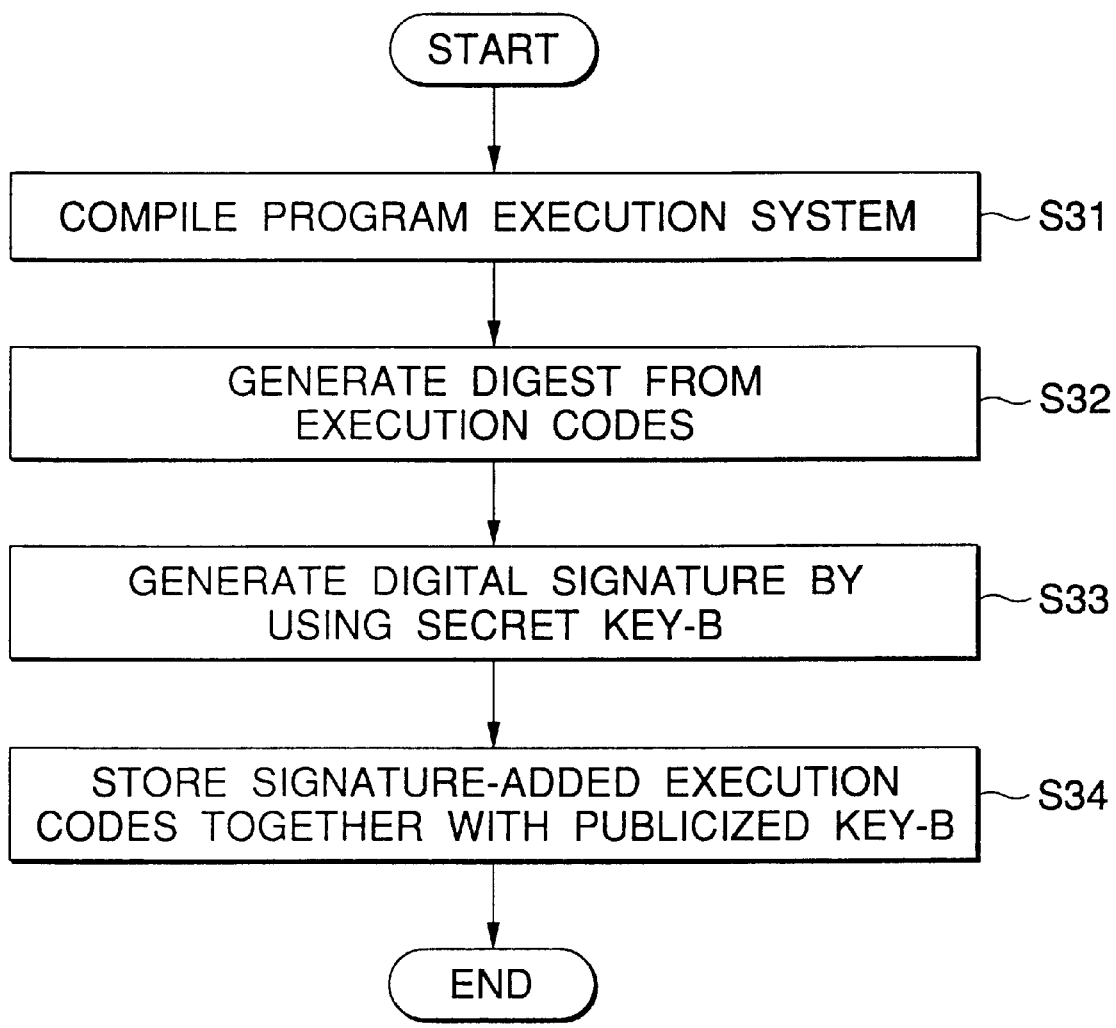
FIG. 19 is a flowchart showing a process of the program certificate authority server 32.

For example, where the program certificate authority provides users with a program execution system in which a signature is added, the program certificate authority server 32 executes a process according to a flowchart of FIG. 19.

In this case, in the program certificate authority server 32, first, at step S31, the CPU 51 compiles a program as a program execution system into codes (hereinafter referred to as "execution codes" where appropriate) that can be executed by the CPU 61 of the user terminal 33. At step S32, the CPU 51 generates a digest from the execution codes that were obtained by the compilation at step S31, for instance, in the manner described above in connection with FIG. 15. The process then goes to step S33, where the CPU 51 encrypts the digest that was generated at step S32 by using, for instance, secret key-B that is used for encrypting publicized key-A, to generate a signature (digital signature). At step S34, the digital signature is added to the execution codes (execution codes to which a digital signature is added are hereinafter referred to as "signature-added execution codes" where appropriate) and the signature-added byte codes are stored in the auxiliary storage device 56 so as to be correlated with publication key-B that is paired with secret key-B that was used in generating the signature. The process is then finished.

Figure 20:
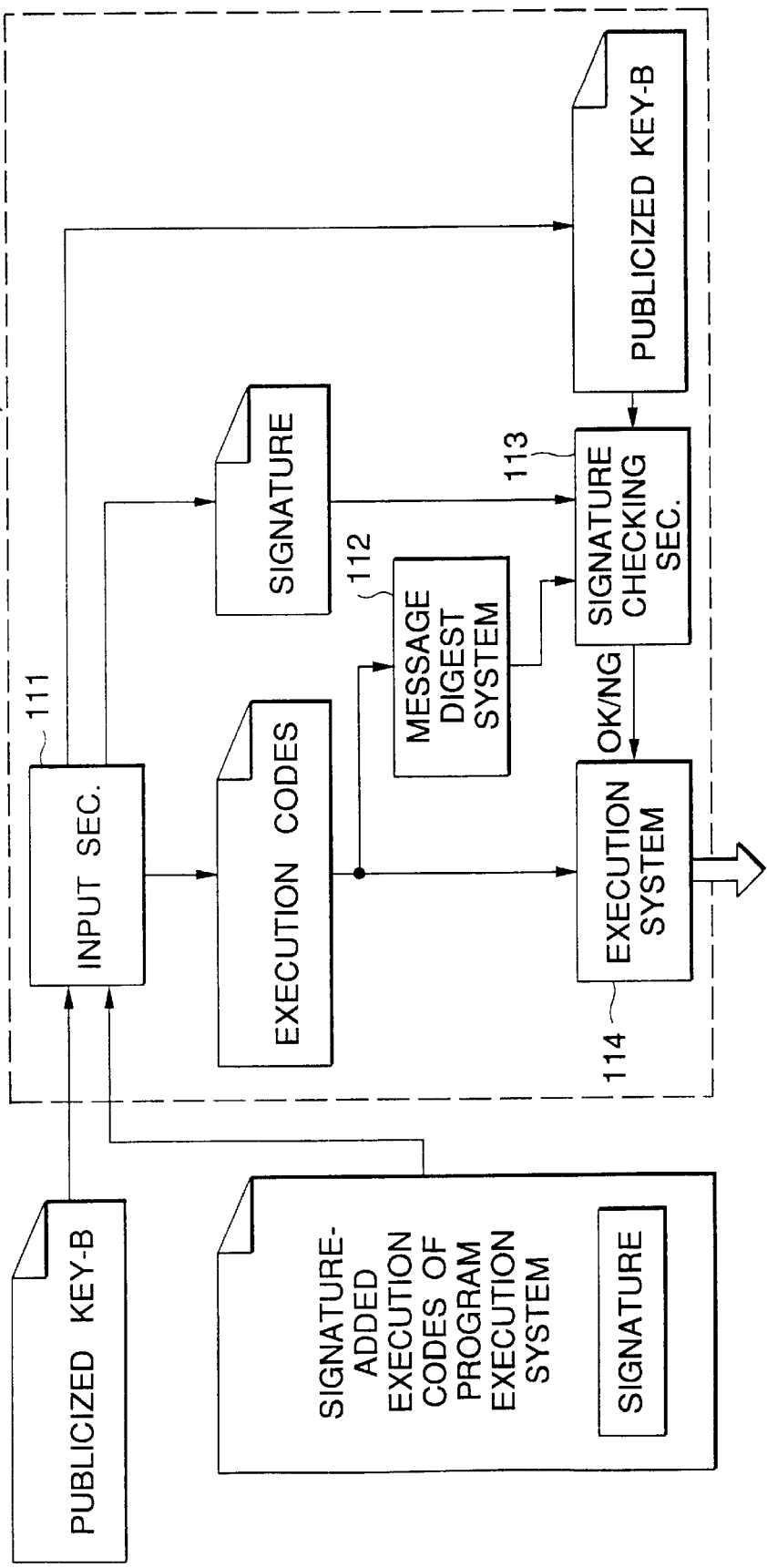
FIG. 20 is a block diagram showing an example of functional configuration of a loader.

FIG. 20 shows an example of functional configuration of a loader (program execution system implementation apparatus) for implementing a program execution system of the above type to which a signature is added (signature-added execution system) in the user terminal 33.

In this embodiment, the loader is constituted of an input section 111, a message digest system 112, a signature checking section 113, and an execution system 114. The input section 111, the message digest system 112, and the signature checking section 113 are configured in the same manner as the input section 101, the message digest system 102, and the signature checking section 103 of FIG. 4, respectively. The execution system 114 corresponds to those sections of the user terminal 33 which include the CPU 61 and interpret and execute execution codes.

In the above-configured loader, the input section 111 acquires signature-added execution codes and publicized key-B. Then, the input section 111 separates the signature-added execution codes into a signature and execution codes, and supplies the signature to the signature checking section 113 and the execution codes to the message digest system 112 and the execution system 114. Further, the input section 111 supplies publicized key-B to the signature checking section 113.

The message digest system 112 generates a digest from the execution codes that are supplied from the input section 111 and supplies the generated digest to the signature checking section 113. The signature checking section 113 decodes the signature that is supplied from the input section 111 into a digest by using publicized key-B that is supplied from the input section 111. Further, the signature checking section 113 compares the digest obtained by the decoding with the digest that is supplied from the message digest system 112, and judges the legitimacy of the signature that is supplied from the input section 111 based on whether the two digests coincide with each other.

If the legitimacy of the signature has been affirmed, that is, if the digest obtained by decoding the signature coincides with the digest supplied from the message digest system 112, the signature checking section 113 controls the execution system 114 so that it interprets and executes the Java byte codes that are supplied from the input section 111. In this case, the execution system 114 interprets and executes the execution codes that are supplied from the input section 111 under the control of the signature checking section 113.

On the other hand, if the legitimacy of the signature has not been confirmed, that is, if the digest obtained by decoding the signature does not coincide with the digest supplied from the message digest system 112, the signature checking section 113 controls the execution system 114 so that the Java byte codes that are supplied from the input section 111 are disregarded. In this case, the execution system 114 disregards the execution codes that are supplied from the input section 111 and hence executes no process under the control of the signature checking section 113.

As described above, in the case where a signature is added to a program execution system, its falsification or the like can be prevented.

As described above, a program execution system can be encrypted, in which case reverse engineering on the program execution system can be prevented.

Figure 21:
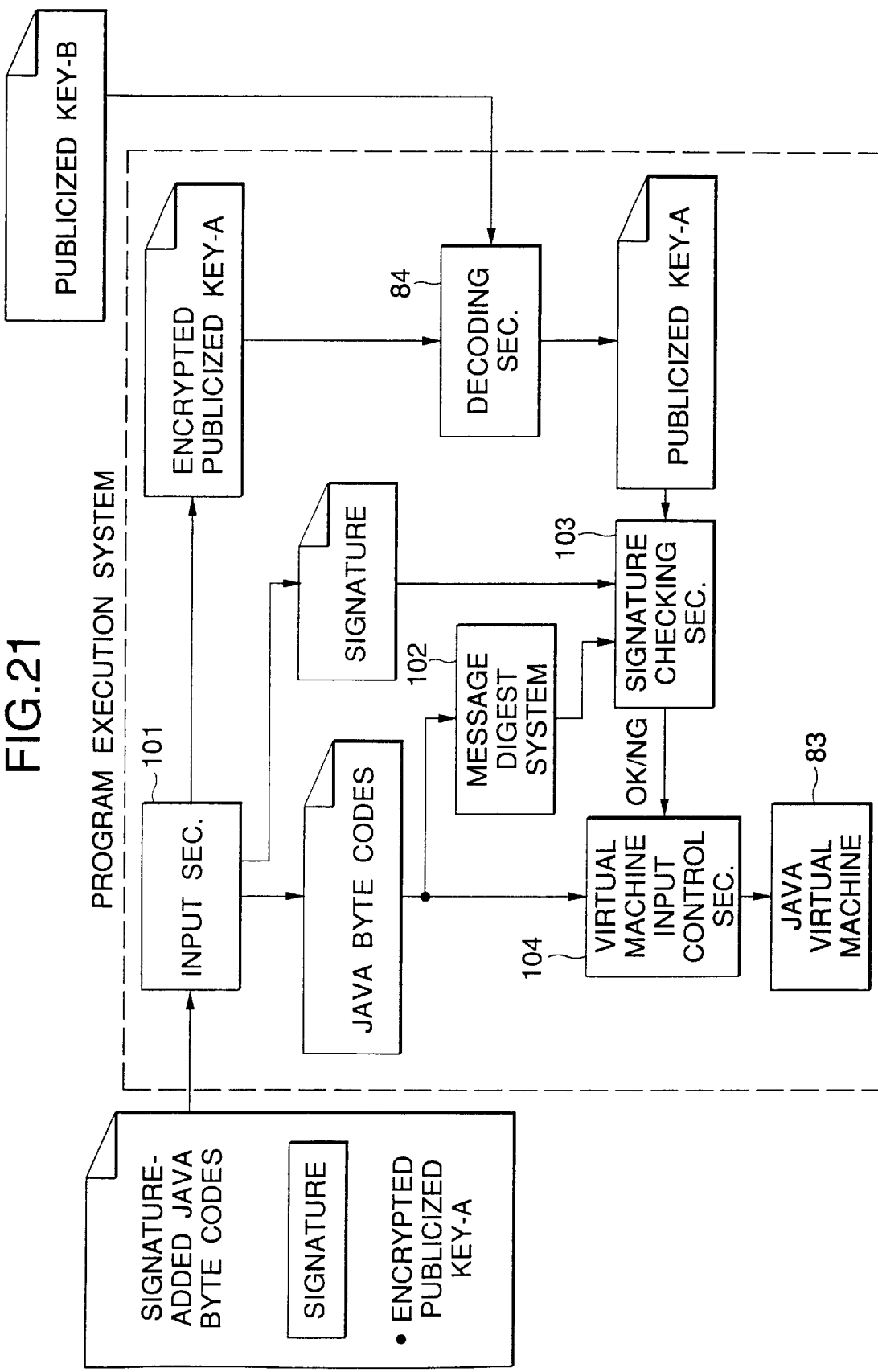
FIG. 21 is a block diagram showing a fourth example of functional configuration of a program execution system.

When the legitimacy of the signature that is added to the program execution system has been confirmed, the execution system 114 interprets and executes the execution codes that are supplied from the input section 111 as described above. As a result, for example, a program execution system similar to the program execution system that is implemented in the case of FIG. 4 is implemented in the user terminal 33 as shown in FIG. 21. However, in this case, publicized key-B is supplied to a decoding section 84 from the input section 111 of the loader of FIG. 20 rather than from an input section 101.

Incidentally, considerable time is needed to encrypts a program having a relatively large information quantity such as an application program or a program of a program execution system according to a publicized key encryption scheme such as the RSA scheme, or to decode its encrypted version. In contrast, encryption/decoding according to a common key encryption scheme such as the DES scheme allows even a program having a large information quantity to be processed in a relatively short time. On the other hand, the RSA scheme causes no problem even if a publicized key to be used for decoding is rendered open to the public as described above because the publicized key is different from a secret key to be used for encryption. However, in the DES scheme, since a common key is used for encryption and decoding, it is necessary to manage the common key strictly so that it does not come to be known to parties other than the parties concerned.

In view of the above, a technique may be employed which allows encryption and decoding processes to be executed in a short time as well as facilitates key management. Specifically, the DES scheme is employed to encrypt a program having a relatively large information quantity such as an application program and a common key that is used for the DES scheme encryption is encrypted according to the RSA scheme. (An encryption technique in which the DES scheme and the RSA scheme are combined with each other will be hereinafter referred to as "combination scheme.")

Figure 22:
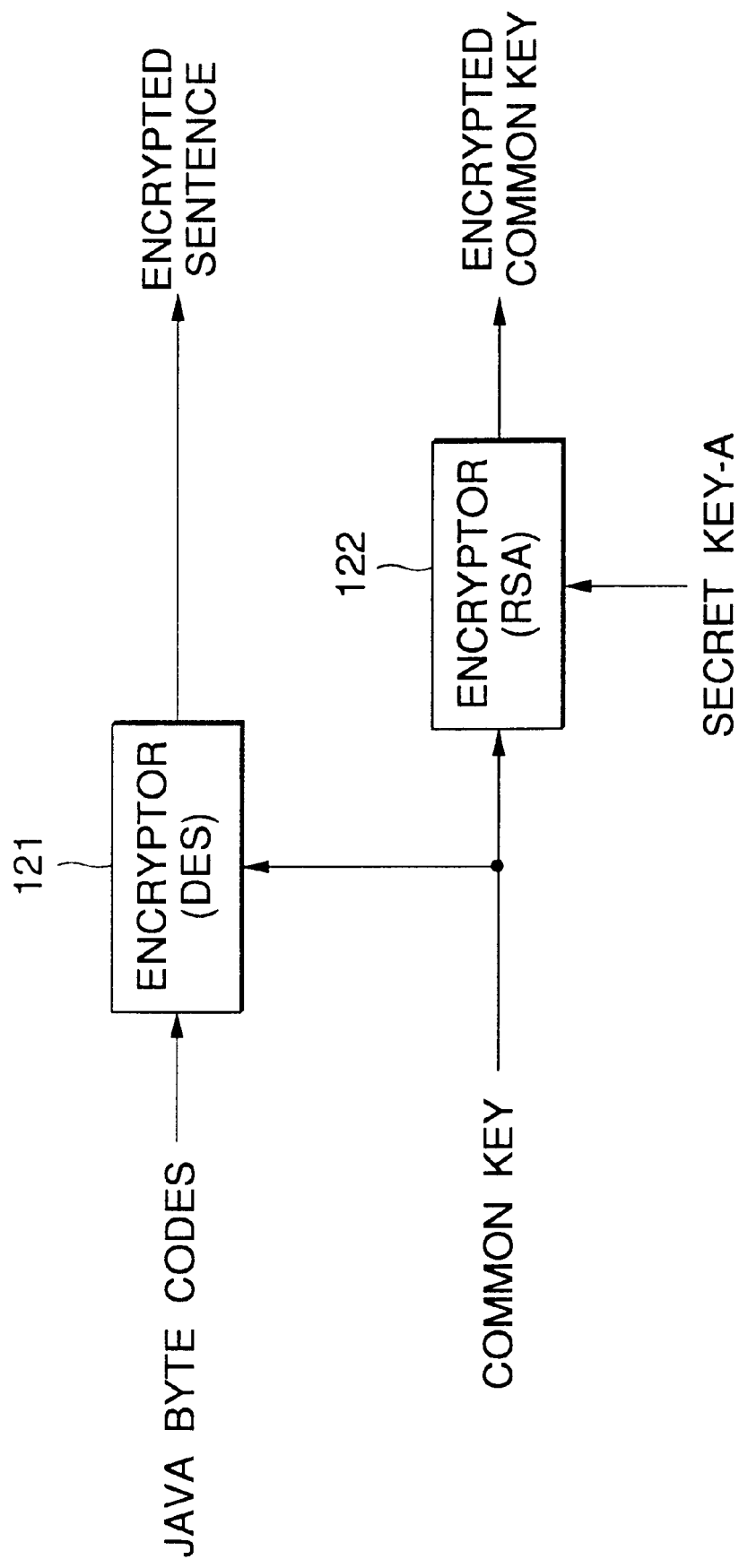
FIG. 22 is a block diagram showing an example of configuration of the software developer server 31.

FIG. 22 shows an example of functional configuration of the software developer server 31 in a case where encryption is performed according to a combination scheme.

Java byte codes that have been obtained by compiling an application program with a Java compiler are input to an encryptor 121. In addition to the Java byte codes, a common key is input to the encryptor 121. In the encryptor 121, the Java byte codes are encrypted into encrypted byte codes (encrypted sentence) by using the common key according to the DES scheme, for instance.

The common key that is input to the encryptor 121 is also input to an encryptor 122. The encryptor 122, which is to perform encryption according to the RSA scheme, for instance, encrypts the common key by using secret key-A.

In this case, a software developer distributes to users a set of encrypted byte codes, a common key that was encrypted by using secret key-A (hereinafter referred to as "encrypted common key" where appropriate), and an encrypted publicized key-A that was acquired from the program certificate authority.

Figure 2:
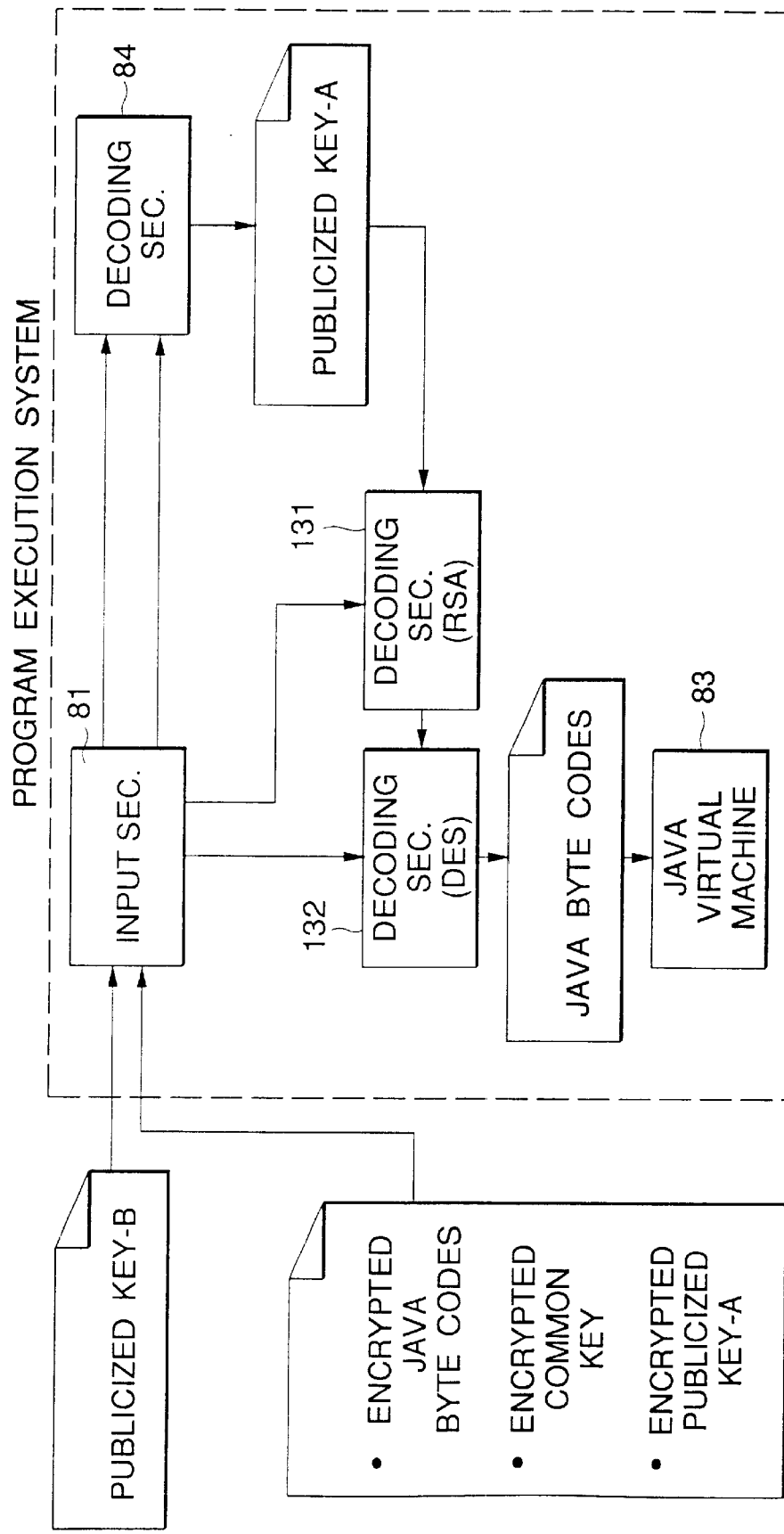
FIG. 2 is a block diagram showing a fifth example of functional configuration of a program execution system.

FIG. 2 shows an example of functional configuration of a program execution system to be implemented in the user terminal 33 in a case where the encryption of an application program is performed according to a combination scheme. The components in FIG. 2 having the corresponding components in the program execution system of FIG. 1 are given the same reference numerals as the latter and descriptions therefor will be omitted where appropriate.

A decoding section 131 decodes an encrypted common key according to the RSA scheme, for instance, and supplies a common key as a decoding result to a decoding section 132. The decoding section 132 decodes encrypted byte codes according to the DES scheme, for instance.

In the above-configured program execution system, an input section 81 acquires an encrypted byte codes (encrypted Java byte codes), an encrypted common key, an encrypted publicized key-A, and publicized key-B. Then, the input section 81 supplies the encrypted publicized key-A and publicized key-B to a decoding section 84, supplies the encrypted common key to the decoding section 131, and supplies the encrypted byte codes to the decoding section 132.

As described above, the decoding section 84 decodes the encrypted publicized key-A into publicized key-A by using the publicized key-B, and supplies the resulting publicized key-A to the decoding section 131. The decoding section 131 decodes the encrypted common key that is supplied from the input section 81 into a common key by using publicized key-A that is supplied from the decoding section 84, and supplies the resulting common key to the decoding section 132. The decoding section 132 decodes the encrypted byte codes that are supplied from the input section 81 into Java byte codes by using the common key that is supplied from the decoding section 131, and supplies the resulting Java byte codes to a Java virtual machine 83.

The above-described combination scheme makes it possible to simplify the key management and increase the processing speed of encryption and decoding.

The combination scheme can be applied to not only the case of encrypting an application program but also a case of encrypting a program (execution codes) of a program execution system and other cases.

The invention can be applied to not only Java virtual machines of both of the above-mentioned interpreter-type and JIT compiler type, but also virtual machines other than the Java virtual machine. The invention can even be applied to a case where input to a program execution system is made through machine codes as in the case of a processing system of the C language or the C++ language, and to a case where input to a program execution system is made through source codes as in the case of a processing system of the Basic language.

Although only a single program execution system is provided in the embodiments of FIGS. 1 and 4, the program execution system can be provided in plurality in the user terminal 33. This will be exemplified below. Where a plurality of input sections 81 or 101 are provided, an encrypted sentence or signature-added byte codes can be input from a plurality of paths. Where a plurality of decoding sections 82 and/or 84 are provided, an encrypted sentence can be decoded according to a plurality of decoding algorithms. Where a plurality of Java virtual machines 83 are provided, it is possible to support a plurality of Java byte code formats. Further, where a plurality of message digest systems 102 and a plurality of signature checking sections 103 are provided, it is possible to check a plurality of signatures that have been added according to a plurality of techniques, respectively.

Although in the above embodiments encryption or signature generation is performed by using a single key, it may be performed by using a plurality of keys. For example, encrypting operations may be performed sequentially by using a plurality of keys and signatures may be generated in a number equal to the number of keys.

In the above embodiments, Java byte codes may be of any of a number of forms such as Java Application, Java Applet, Java Benas, and Java Class Library.

In the information processing apparatus according to the first aspect of the present invention and the information processing method according to the second aspect of the present invention, an encrypted version of a first key that is necessary to decode an encrypted version of a program is decoded by using a second key, and the encrypted version of the program is decoded by using the first key that is obtained through the decoding. The program that is obtained by the decoding is then executed. On the recording medium according to the third aspect of the present invention, a program for causing a computer to decode, by using a second key, an encrypted version of a first key that is necessary to decode an encrypted version of a program, decode the encrypted version of the program by using the first key that is obtained through the decoding, and execute the program that is obtained by the decoding is recorded. Therefore, it becomes possible to allow execution of a program only when a first key and the program have been decoded.

In the information processing apparatus according to the fourth aspect of the present invention and the information processing method according to the fifth aspect of the present invention, a program is encrypted into encrypted sentences to be decoded into codes that can be executed by the information processing apparatus according to the first aspect of the present invention. On the recording medium according to the sixth aspect of the present invention, a program being encrypted into encrypted sentences to be decoded into codes that can be executed by the information processing apparatus according to the first aspect of the present invention is recorded. Therefore, it becomes possible to provide an encrypted program that can be executed by the information processing apparatus according to the first aspect of the present invention.

In the information processing apparatus according to the seventh aspect of the present invention and the information processing method according to the eighth aspect of the present invention, an encrypted version of a first key to be used in checking a signature that is added to a program is decoded by using a second key, and it is checked, by using the first key that is obtained through the decoding, whether the signature that is added to the program is legitimate. The program is executed only when it is affirmed to be legitimate. On the recording medium according to the ninth aspect of the present invention, a program for causing a computer to decode, by using a second key, an encrypted version of a first key to be used in checking a signature that is added to a program, check, by using the first key that is obtained through the decoding, whether the signature that is added to the program is legitimate, and execute the program only when it is affirmed to be legitimate is recorded. Therefore, it becomes possible to allow execution of a program only when a signature that is added to the program is legitimate.

In the information processing apparatus according to the tenth aspect of the present invention and the information processing method according to the eleventh aspect of the present invention, a program is processed so that a signature will be confirmed to be legitimate in the information processing apparatus according to the seventh aspect of the present invention. On the recording medium according to the twelfth aspect of the present invention, a program having been processed so that a signature will be confirmed to be legitimate in the information processing apparatus according to the seventh aspect of the present invention is recorded. Therefore, it becomes possible to provide a program that has been processed so as to be executable by the information processing apparatus according to the seventh aspect of the present invention.

What is claimed is:

1. An information processing apparatus which performs a process for executing a program, comprising:

first key decoding means for decoding using a second key an encrypted version of a first key and producing a decoded first key;

second key decoding means for decoding using the decoded first key an encrypted version of a third key provided by a software developer and producing a decoded third key, wherein the program was encrypted by the software developer using the decoded third key into an encrypted version of the program;

program decoding means for decoding the encrypted version of the program using the decoded third key obtained from the second key decoding means, wherein the program is certified by a program certifying authority as being licensed to execute in a predetermined program execution environment by having the program certifying authority produce the second key and the encrypted version of the first key; and executing means for executing a decoded program output from the program decoding means, wherein the third key is a common key used for encrypting the program according to a first encryption scheme, the second key is a publicized key corresponding to a secret key used for encrypting the first key according to a second encryption scheme, and the first key is a publicized key corresponding to a secret key used for encrypting the third key according to the second encryption scheme.

2. The information processing apparatus according to claim 1, further comprising processing means including a program execution apparatus for processing the program so that a signature is determined to be legitimate when the decoded first key confirms that the signature is legitimate and for supplying a confirmation to the program execution apparatus of the processing means.

3. An information processing method for performing a process for executing a program, comprising the steps of:

decoding using a second key an encrypted version of a first key to produce a decoded first key decoding using the decoded first key an encrypted version of a third key provided by a software developer and producing a decoded third key, wherein the program was encrypted by the software developer using the decoded third key into an encrypted version of the program;

decoding the encrypted version of the program using the decoded third key, wherein the program is certified by a program certifying authority as being licensed to execute in a predetermined program execution environment by having the program certifying authority produce the second key and the encrypted version of the first key; and executing the decoded program, wherein the third key is a common key used for encrypting the program according to a first encryption scheme, the second key is a publicized key corresponding to a secret key used for encrypting the first key according to a second encryption scheme, and the first key is a publicized key corresponding to a secret key used for encrypting the third key according to the second encryption scheme.

4. A recording medium for selectively allowing a program to be executed, the recording medium comprising:

a first key decoding portion for decoding using a second key an encrypted version of a first key and producing a decoded first key;

a second key decoding portion for decoding using the decoded first key an encrypted version of a third key provided by a software developer and producing a decoded third key, wherein the program was encrypted by the software developer using the decoded third key into an encrypted version of the program;

a program decoding portion for decoding the encrypted version of the program using the decoded third key obtained from the second key decoding portion, wherein the program is certified by a program certifying authority as being licensed to execute in a predetermined program execution environment by having the program certifying authority produce the second key and the encrypted version of the first key; and a program execution portion for executing the decoded program, wherein the third key is a common key used for encrypting the program according to a first encryption scheme, the second key is a publicized key corresponding to a secret key used for encrypting the first key according to a second encryption scheme, and the first key is a publicized key corresponding to a secret key used for encrypting the third key according to the second encryption scheme.

* * * * *